(12) United States Patent
Mueller

(10) Patent No.: US 12,163,584 B2
(45) Date of Patent: Dec. 10, 2024

(54) HYBRID PRESSURIZED AND NON-PRESSURIZED LUBRICATION SYSTEM FOR AIRCRAFT GEARBOX

(71) Applicant: TEXTRON INNOVATIONS INC., Providence, RI (US)

(72) Inventor: Russell L. Mueller, Coppell, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/858,800

(22) Filed: Jul. 6, 2022

(65) Prior Publication Data
US 2022/0349465 A1 Nov. 3, 2022

Related U.S. Application Data

(62) Division of application No. 16/152,919, filed on Oct. 5, 2018, now abandoned.

(51) Int. Cl.
*F16H 57/04* (2010.01)
*B64C 27/12* (2006.01)
(Continued)

(52) U.S. Cl.
CPC ....... *F16H 57/046* (2013.01); *F16H 57/0423* (2013.01); *F16H 57/045* (2013.01);
(Continued)

(58) Field of Classification Search
CPC ............. F16H 57/0421; F16H 57/0423; F16H 57/045; F16H 57/0456; F16H 57/046; F16H 57/0457
See application file for complete search history.

(56) References Cited

U.S. PATENT DOCUMENTS 2,211,363 A * 8/1940 Brenkert ............. F16H 57/0421
184/6.12
3,771,622 A * 11/1973 Hyakumura ........ F16H 57/0483
180/24.09
(Continued)

FOREIGN PATENT DOCUMENTS

CN 111520464 B * 3/2021

*Primary Examiner* — Minh Truong
(74) *Attorney, Agent, or Firm* — Akona IP PC

(57) ABSTRACT

In some examples, an aircraft gearbox comprises a plurality of gears and a hybrid lubrication system to lubricate the plurality of gears. The plurality of gears comprises a first gear and a second gear. The plurality of gears operable to rotate based on torque received from a driveshaft. The hybrid lubrication system comprises a pressurized lubrication system and a non-pressurized lubrication system. The pressurized lubrication system comprises a nozzle to spray a lubricant onto the first gear. The non-pressurized lubrication system comprises a reservoir to catch a portion of the lubricant from the pressurized lubrication system. The second gear is operable to disperse the lubricant across others of the plurality of gears based on the second gear rotating through the portion of the lubricant. The non-pressurized lubrication system further comprises a shroud configured to confine the portion of the lubricant within the non-pressurized lubrication system and to return overspray of the lubricant sprayed onto the first gear and lubricant dispersed by the second gear to the reservoir.

20 Claims, 22 Drawing Sheets

(51) Int. Cl.
*B64C 29/00* (2006.01)
*B64D 35/00* (2006.01)

(52) U.S. Cl.
CPC ..... *F16H 57/0456* (2013.01); *F16H 57/0457* (2013.01); *B64C 27/12* (2013.01); *B64C 29/0033* (2013.01); *B64D 35/00* (2013.01)

(56) References Cited

U.S. PATENT DOCUMENTS

| | | | |
|---|---|---|---|
| 8,944,216 B2* | 2/2015 | Rollins | F16H 57/0456 |
| | | | 184/6.12 |
| 2011/0271792 A1* | 11/2011 | Rollins | F16H 57/0456 |
| | | | 74/606 R |
| 2013/0247717 A1* | 9/2013 | Hadwani | A01D 41/12 |
| | | | 74/665 G |
| 2018/0066746 A1* | 3/2018 | Kim | F16H 57/0453 |
| 2018/0259060 A1* | 9/2018 | Poster | F16H 57/0457 |
| 2020/0408297 A1* | 12/2020 | Ishikawa | F16H 57/021 |

* cited by examiner

HYBRID PRESSURIZED AND NON-PRESSURIZED LUBRICATION SYSTEM FOR AIRCRAFT GEARBOX

CROSS-REFERENCE TO RELATED APPLICATION

This application is a divisional and claims the benefit of priority under 35 U.S.C. § 120 of U.S. application Ser. No. 16/152,919, filed on Oct. 5, 2018, entitled "HYBRID PRESSURIZED AND NON-PRESSURIZED LUBRICATION SYSTEM FOR AIRCRAFT GEARBOX." The disclosure of the prior application is considered part of and is incorporated in its entirety by reference in the disclosure of this application.

TECHNICAL FIELD

This disclosure relates generally to transmission systems, and more particularly, though not exclusively, to systems and apparatuses for cooling a gear in a transmission system.

BACKGROUND

Aircraft include many components and systems that are powered by an engine. For example, an engine provides power to flight-critical components such as rotors, which keep the aircraft airborne during flight, and to auxiliary systems such as fans, blowers, pumps, generators, and interior climate control systems, which may control non-flight-critical components. The engine provides power to the components and systems through a drive system. The drive system includes, e.g., masts, driveshafts, bearings, and gears which transfer torque from the engine to the components and systems. A lubrication system lubricates the drive system. The lubrication helps protect components of the drive system from wear and facilitates movement of the components so that they effectively transfer torque. In some drive systems, the components may rotate at thousands of revolutions per minute (RPM) during operation and generate heat. The lubrication system can transfer heat from the drive system and cool the components. For example, a pressurized lubrication system can use pressure to spread a lubricant on the drive system. When properly functioning, the lubrication system can reduce the likelihood of the drive system losing torque, failing, and/or overheating. The drive system is more susceptible to losing torque, failing (in whole or in part), and/or overheating when the lubrication system is malfunctioning and/or not functioning at all. Thus, maintaining a properly functioning lubrication system is critical to the safety and the service life of the aircraft.

SUMMARY

In some examples, a gearbox includes a plurality of gears and a hybrid lubrication system to lubricate the plurality of gears. The plurality of gears includes a first gear and a second gear. The plurality of gears is operable to rotate based on torque received from a driveshaft. The hybrid lubrication system includes a pressurized lubrication system and a non-pressurized lubrication system. The pressurized lubrication system includes a nozzle to spray a lubricant onto the first gear. The non-pressurized lubrication system includes a reservoir to catch a portion of the lubricant from the pressurized lubrication system. The second gear is operable to disperse the lubricant across others of the plurality of gears based on the second gear rotating through the portion of the lubricant.

In other examples, an aircraft includes an engine, a driveshaft coupled to the engine, and a gearbox coupled to the driveshaft. The gearbox includes a plurality of gears operable to rotate based on torque received from the driveshaft and a hybrid lubrication system operable to lubricate the plurality of gears. The plurality of gears includes a first gear and a second gear. The hybrid lubrication system includes a pressurized lubrication and a non-pressurized lubrication. The pressurized lubrication system includes a nozzle operable to spray a lubricant onto the first gear. The non-pressurized lubrication system includes a reservoir operable to catch a portion of the lubricant from the pressurized lubrication system. The second gear is operable to disperse the lubricant onto others of the plurality of gears based on rotating through the portion of the lubricant.

In still other examples, a method includes providing an aircraft gearbox comprising a plurality of gears and lubricating the plurality of gears with a hybrid lubrication system. The plurality of gears includes a first gear and a second gear. The hybrid lubrication system includes a pressurized lubrication system and a non-pressurized lubrication system. The method further includes: spraying, by a nozzle in the pressurized lubrication system, a lubricant onto the first gear; catching, by a reservoir in the non-pressurized lubrication system, a portion of the lubricant from the pressurized lubrication system; and dispersing the lubricant onto others of the plurality of gears based on the second gear rotating through the portion of the lubricant.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Example embodiments that may be used to implement the features and functionality of this disclosure will now be described with more particular reference to the attached Figures.

Figure 1A:
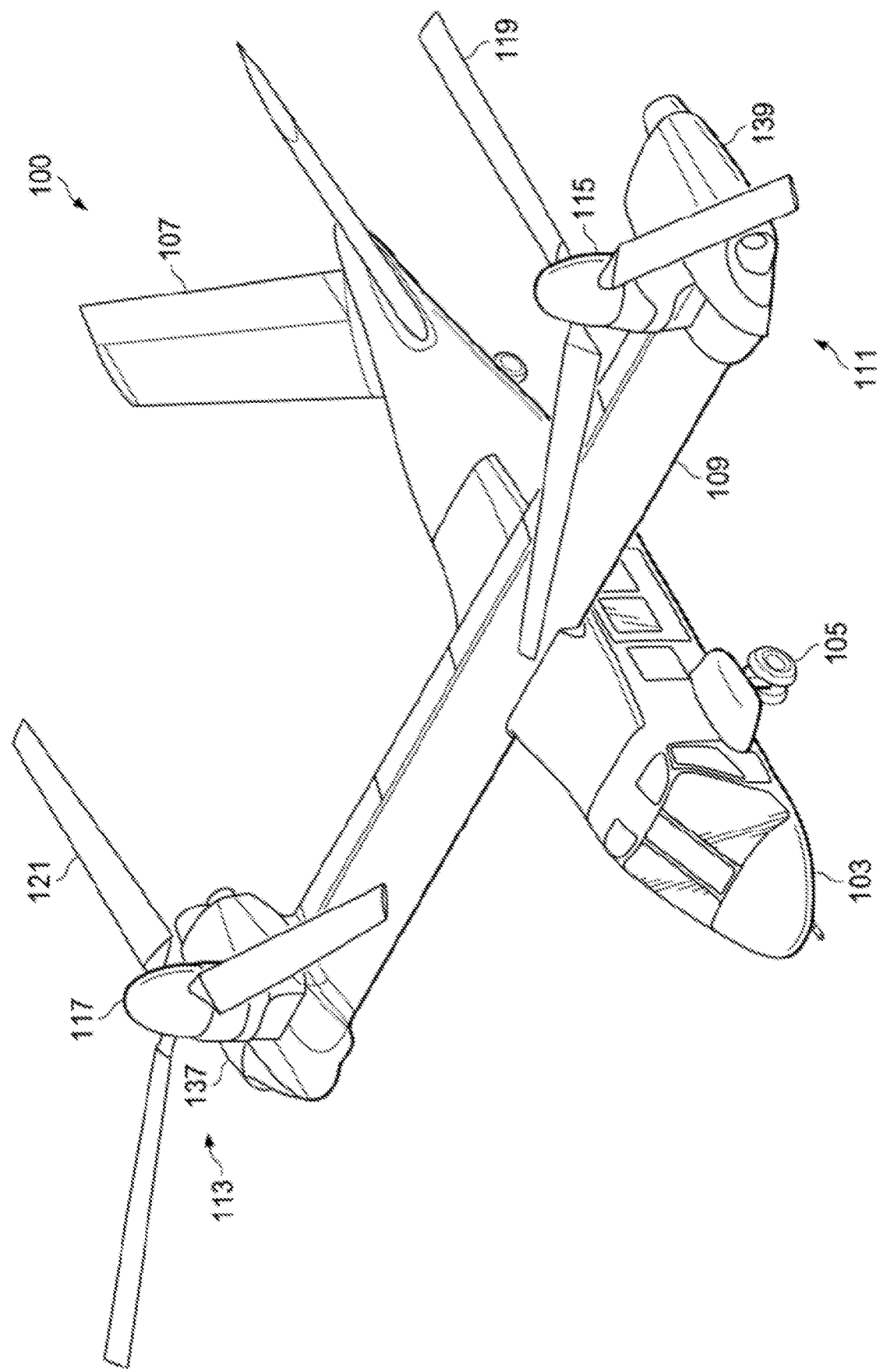
FIGS. 1A, 1B, 2A, and 2B illustrate example aircraft, in accordance with some embodiments of the present disclosure
Figure 1B:
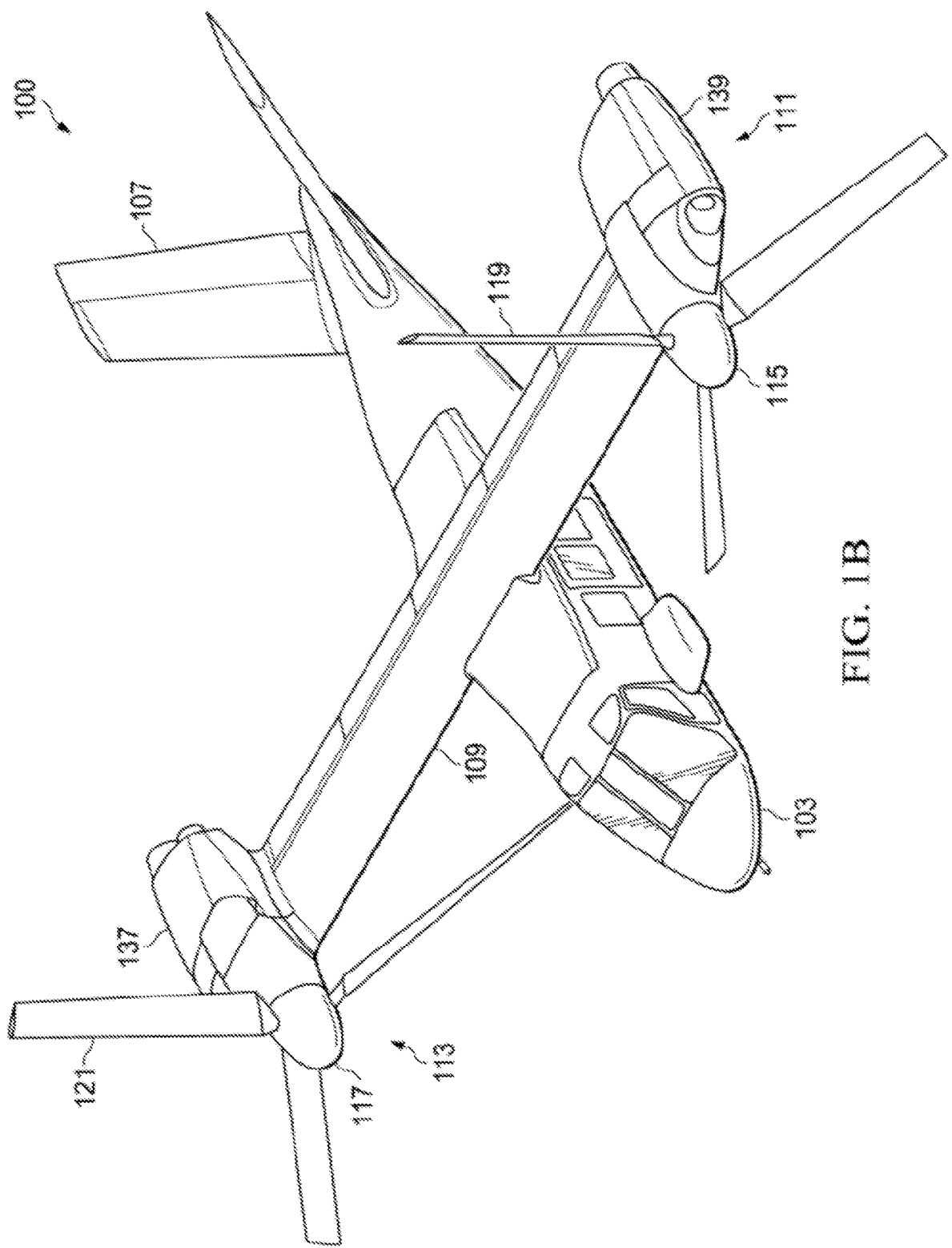

FIGS. 1A and 1B illustrate an exemplary aircraft, which in this case is a tiltrotor aircraft 100. Tiltrotor aircraft 100 can include a fuselage 103, a landing gear 105, a tail member 107, a wing 109, a drive system 111, and a drive system 113. Each drive system 111 and 113 includes a fixed engine 137 and fixed engine 139, respectively, and a proprotor 115 and 117, respectively. Each of the proprotors 115 and 117 is rotatable and has a plurality of rotor blades 119 and 121, respectively, associated therewith. The position of proprotors 115 and 117, as well as the pitch of rotor blades 119 and 121, can be selectively controlled in order to selectively control direction, thrust, and lift of the tiltrotor aircraft 100.

FIG. 1A illustrates the tiltrotor aircraft 100 in helicopter mode, in which proprotors 115 and 117 are positioned substantially vertical to provide a lifting thrust. FIG. 1B illustrates tiltrotor aircraft 100 in an airplane mode in which proprotors 115 and 117 are positioned substantially horizontal to provide a forward thrust in which a lifting force is supplied by wing 109. It should be appreciated that tiltrotor aircraft can be operated such that proprotors 115 and 117 are selectively positioned between airplane mode and helicopter mode, which can be referred to as a conversion mode.

The drive system 113 is substantially symmetric to the drive system 111. Only for the sake of brevity, certain features will be disclosed only with regard to drive system 111. However, one of ordinary skill in the art will fully appreciate an understanding of the drive system 113 based upon the disclosure herein of the drive system 111.

Further, drive systems 111 and 113 are illustrated in the context of tiltrotor aircraft 100; however, drive systems 111 and 113 can be implemented on other tiltrotor aircraft. For example, an alternative embodiment may include a quad tiltrotor that has an additional wing member aft of wing 109; the additional wing member can have additional drive systems similar to drive systems 111 and 113. In another embodiment, drive systems 111 and 113 can be used with an unmanned version of tiltrotor aircraft 100. Further, drive systems 111 and 113 can be integrated into a variety of tiltrotor aircraft configurations. Additionally, other drive systems are contemplated. For example, in some embodiments a gearbox arrangement provides torque to a rotor system of a helicopter.

Figure 2A:
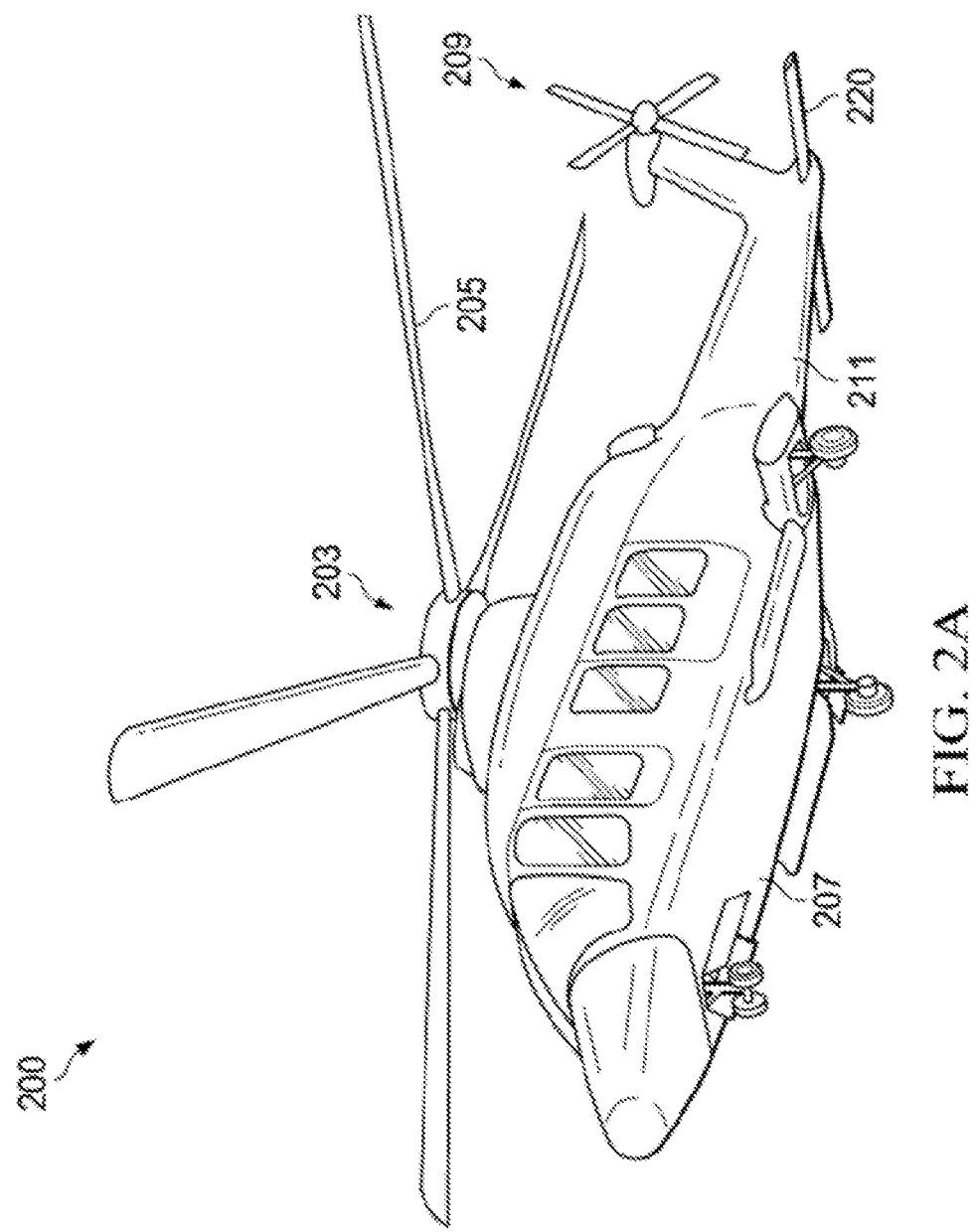
Figure 2B:
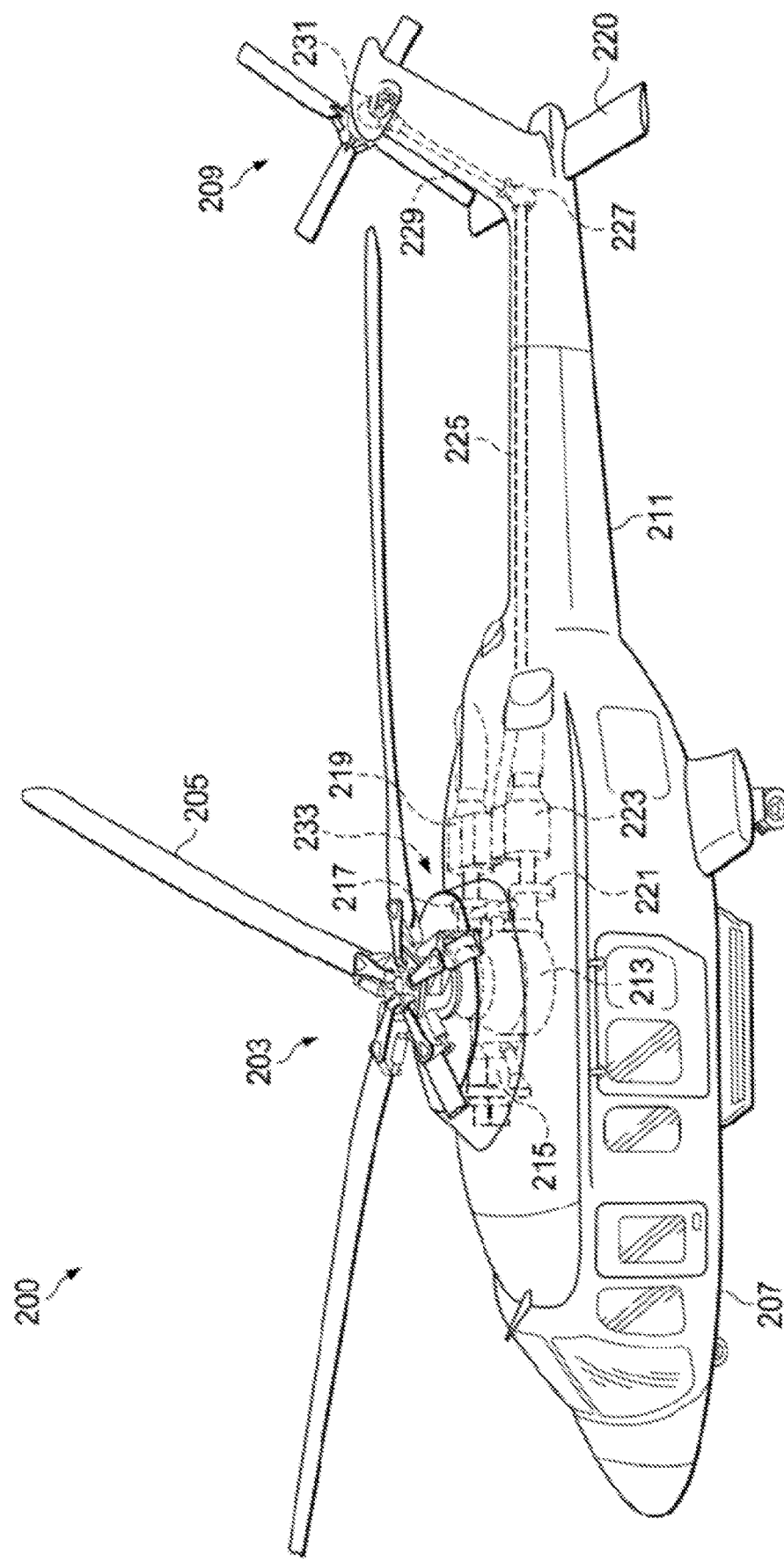

FIGS. 2A and 2B illustrate another exemplary aircraft, which in this case is a rotorcraft 200. FIG. 2A illustrates a perspective view of the rotorcraft 200, while FIG. 2B illustrates an alternative perspective view including some components of a drive system of the rotorcraft 200. Rotorcraft 101 includes an airframe (hidden beneath an outer mold line of the rotorcraft) and a rotor system 203 coupled to the airframe and the engines of the drive system. The rotor system 203 includes with a plurality of rotor blades 205. The pitch of each rotor blade 205 can be managed or adjusted in order to selectively control direction, thrust, and lift of the rotorcraft 200. The rotorcraft 200 further includes a fuselage 207, tail rotor and anti-torque system 209, an empennage 211, and a tail structure 220, each of which is attached to the airframe. The tail structure 220 may be used as a horizontal stabilizer. Torque is supplied to rotor system 203 and anti-torque system 209 from engines 223 and 219.

FIG. 2B illustrates additional details of a drive system 233 of the rotorcraft 200. The drive system 233 includes a main rotor gearbox 213, which connected to a rotor mast. The rotor mast is operable to rotate the rotors blades 205. The main rotor gearbox 213 is connected to one or more accessory gear boxes 215 and engine reduction gearboxes 217 and 221. Each of the engine reduction gearboxes 217 and 221 is connected to one or more engines 219 and 223 by a driveshaft. A tail rotor driveshaft 225 transmits mechanical rotation from the main rotor gearbox 213 to the tail rotor gear box 231, which is connected via tail rotor drive shaft 229 and intermediate gear box 227. The tail rotor gear box 231 is operable to rotate the tail rotor and anti-torque system 209.

It should be appreciated that the tiltrotor aircraft 100 of FIGS. 1A and 1B and the rotorcraft 200 of FIGS. 2A and 2B are merely illustrative of a variety of aircraft that can be used to implement embodiments of the present disclosure. Other aircraft implementations can include, for example, fixed wing airplanes, hybrid aircraft, unmanned aircraft, gyrocopters, a variety of helicopter configurations, and drones, among other examples. Moreover, it should be appreciated that even though aircraft are particularly well suited to implement embodiments of the present disclosure, the described embodiments can also be implemented using non-aircraft vehicles and devices.

When properly functioning, a pressurized lubrication system can reduce the likelihood of a drive system such as the drive systems 111 and/or 233 from losing torque, failing, and/or overheat. For example, the pressurized lubrication system may operate properly when the pressure is maintained above a threshold pressure limit such as about 30 pounds per square inch (PSI) or about 50 PSI. A drive system is more susceptible to losing torque, failing (in whole or in part), and/or overheating when the lubrication system is malfunctioning and/or not functioning at all. For example, the pressurized lubrication system may not operate properly when the pressure drops below the threshold pressure limit. Maintaining a properly functioning lubrication system is critical to the safety service life of the aircraft.

Pressurized lubrication systems can help to dissipate heat from and maintain the service life of a drive system. Pressurized lubrication systems, however, can sometimes fail resulting in a loss of lubrication (LOL). If the design of gears in the gearbox rely on the pressurized lubrication system to, e.g., maintain proper operating temperature, then any failure such as LOL could cause result in a catastrophic failure of the gears in the gearbox and could hinder the ability of an aircraft to remain in flight. LOL is characterized, for example, by the pressurized lubrication system reaching an operating pressure that is at or below the threshold pressure limit, for example, about 20 PSI, about 10 PSI, or about zero PSI. LOL can be caused, e.g., by failure of a pump to create the pressure for the pressurized lubrication system, a failure of an engine that supplies power to the pump, and/or by a leak in the pressurized lubrication system that allows the lubricant to escape from the pressurized lubrication system. Some aviation regulations require that an aircraft's pressurized lubrication system remain operable for a specified amount of time after LOL. As a result, some aircraft use redundant pressurized lubrication systems to reduce the likelihood of LOL, e.g., in one portion of the system from affecting other portions of the system. Such redundancy can be financially costly and can add weight to the aircraft, which can reduce flight and fuel efficiently.

A solution disclosed herein includes a hybrid lubrication system, a portion of which is pressurized and a portion of which is non-pressurized, to lubricate a drive system. The pressurized portion of the hybrid lubrication system uses pressure to lubricate the drive system. Advantageously, the non-pressurized portion of the hybrid lubrication system passively collects lubricant indirectly from the pressurized portion and uses motion of the drive system components themselves to disperse the lubricant instead of using pressure. The embodiments described throughout this disclosure provide numerous technical advantages including that the non-pressurized portion of the hybrid lubrication system can continue to provide lubricant to a portion of a drive train even after the pressurized portion of the hybrid lubrication system is no longer able to supply lubricant, e.g., due to a loss of lubricant event. For example, a non-pressurized lubrication system can include a reservoir to catch a portion of the lubricant from a pressurized lubrication system. A drive system component such as a gear or a driveshaft is operable to disperse the lubricant across components of the drive system based on the drive system component rotating through the portion of the lubricant.

Figure 3:
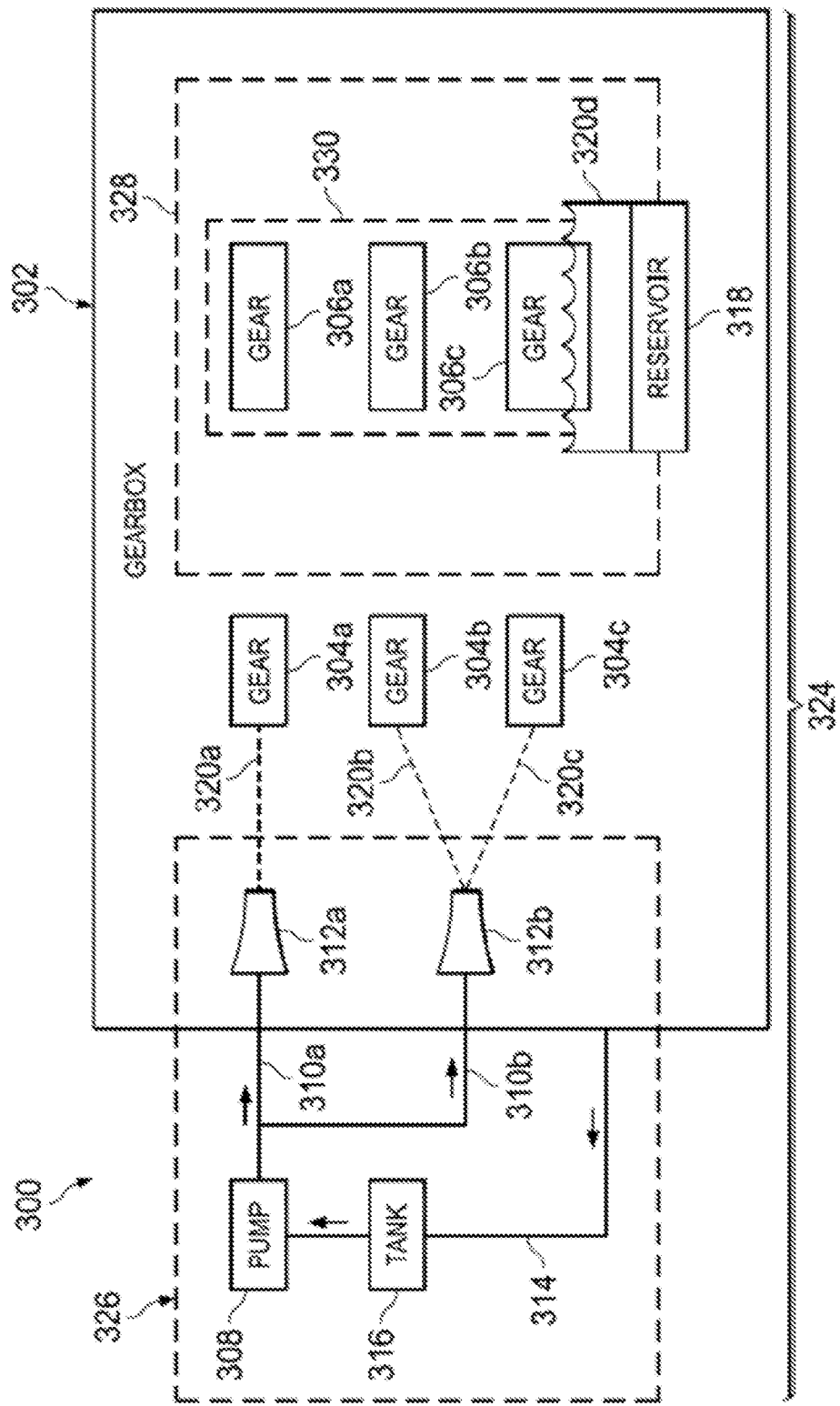
FIG. 3 illustrates a system in which a hybrid lubrication system lubricates gears in a gearbox.

FIG. 3 illustrates a portion of a drive system 300 in which a hybrid lubrication system 324, which lubricates gears in a gearbox 302, in accordance with some embodiments of the present disclosure. The gearbox 302 includes a plurality of gears and a hybrid lubrication system to lubricate the plurality of gears. The plurality of gears includes a first set of gears 304 including gears 304a, 304b, and 304c and a second set of gears 306 including gears 306a, 306b, and 306c. Each of the gears 306a, 306b, and 306c includes a gear shaft about which the gear rotates and a plurality of teeth that are operable to mesh with at least one other of the gears. The hybrid lubrication system 324 includes a pressurized lubrication system 326 and a non-pressurized lubrication system 328. The pressurized lubrication system 326 includes a tank 316, a pump 308, pressurized tubes 310a, 310b, and 314, and nozzles 312a and 312b. Each of the nozzles 312a and 312b is operable to spray a lubricant 320, which includes portions 320a, 320b, 320c, and 320d, onto one or more gear in the first set of gears 304. For example, the nozzle 312a sprays the gear 304a with a portion of the lubricant 320a and the nozzle 312b sprays the gears 304b and 304c with portions of the lubricant 320b and 320c, respectively. As the nozzles spray the first set of gears 304 with the lubricant, some of the lubricant may travel to other locations in the gearbox 302. For example, a field of spray of a nozzle may be larger than a corresponding gear, which can cause an overspray to reach other locations in the gearbox 302. As another example, the lubricant when sprayed at the first set of gears 304 in a pressurized stream may reflect off one or more of the gears and land in other locations in the gearbox 302. The non-pressurized lubrication system 328 includes a reservoir 318 to catch a portion of the lubricant 320d from the pressurized lubrication system 326. The portion of the lubricant 320d may be captured from other portions of the lubricant such as 320a, 320b, and 320c. One or more of the second set of gears 306 such as the gear 306c is operable to disperse the portion of the lubricant 320d across others of the gears 306 based on the gear 306c rotating through the portion of the lubricant 320d. Advantageously, because the reservoir 318 passively catches (and stores) a quantity of the lubricant 320, the gear 306c can continue to disperse the lubricant 320 from the reservoir 318 even when the pressurized lubrication system experiences a loss of lubrication, e.g., when pressure in the tubes 310a and 310b drops below a threshold pressure limit or loses the lubricant due to a leak.

In some embodiments, the non-pressurized lubrication system 328 includes a shroud 330. The shroud 330 confines the lubricant 320d as it is dispersed from the reservoir 318 by the gear 306c. The shroud 330 can help the reservoir 318 to catch the portion of the lubricant 320d from the pressurized lubrication system 326. For example, overspray of lubricant from the nozzles 312a and 312b can reach an outer surface of the shroud 330. The lubricant can drip down the outer surface of the shroud 330 to the reservoir 318 where it can collect and form the portion of the lubricant 320d. In addition, the shroud 330 can help to reserve the portion of the lubricant 320d for use in the non-pressurized lubrication system 328 separate from the pressurized lubrication system 326. As the gear 306c rotates through the portion of the lubricant 320d, it can be thrown in all directions around the gear 306c enabling it to reach the gear 306b and/or gear 306a. In turn, the other gears 306a and/or 306b may throw some of the lubricant in all directions around the gears 306a and/or 306b. The shroud 330 can prevent the portion of the lubricant 320d from being ejected from the non-pressurized lubrication system 328 due to being thrown from the gears 306a, 306b, and/or 306c. An inner surface of the shroud 330 is a barrier that can catch lubricant thrown from the gears 306a, 306b, and 306c. The lubricant can drip down the inner surface of the shroud 330 back to the reservoir 318, where it can be repeatedly used by the non-pressurized lubrication system 328. Because the shroud 330 retains the portion of the lubricant 320d within the non-pressurized lubrication system 328 and, at least in partially, separates it from the pressurized lubrication system 326, the non-pressurized lubrication system 328 can continue to lubricate the gears 306a, 306b, and 306c during a LOL in the pressurized lubrication system 326. The portion of the lubricant 320d can remain within the safety of the shroud 330 (and accessible for use by the non-pressurized lubrication system 328)

even after the pressurized lubrication system 326 runs out of lubricant. In some examples, the non-pressurized lubrication system 328 can continue to operate for over 30 minutes after the pressurized lubrication system 326 runs out of lubricant.

While the non-pressurized lubrication system 328 is illustrated in FIG. 3 with a single reservoir, embodiments of the present disclosure are not limited to a single reservoir. Embodiments of the present disclosure may include any number of reservoirs un which to collect the lubricant.

A lubricant is a substance introduced to reduce friction between moving surfaces. Examples of lubricants can include oil, biolubricants derived from plants and animals, synthetic oils, solid lubricants, and aqueous lubricants. Example lubricants may include oils meeting United States Military specification MIL-PRF-23699 (5 cSt), United States Department of Defense (DoD) specifications DOD-L-7808 (3-4 cSt) and DOD-PRF-85734 (5 cSt), and other oils in the 9 cSt to 10 cSt viscosity range. The drive system 300 may include one or more lubrication systems to provide lubricant to sets of gears 304 and 306 and/or other the mechanical components.

Figure 4:
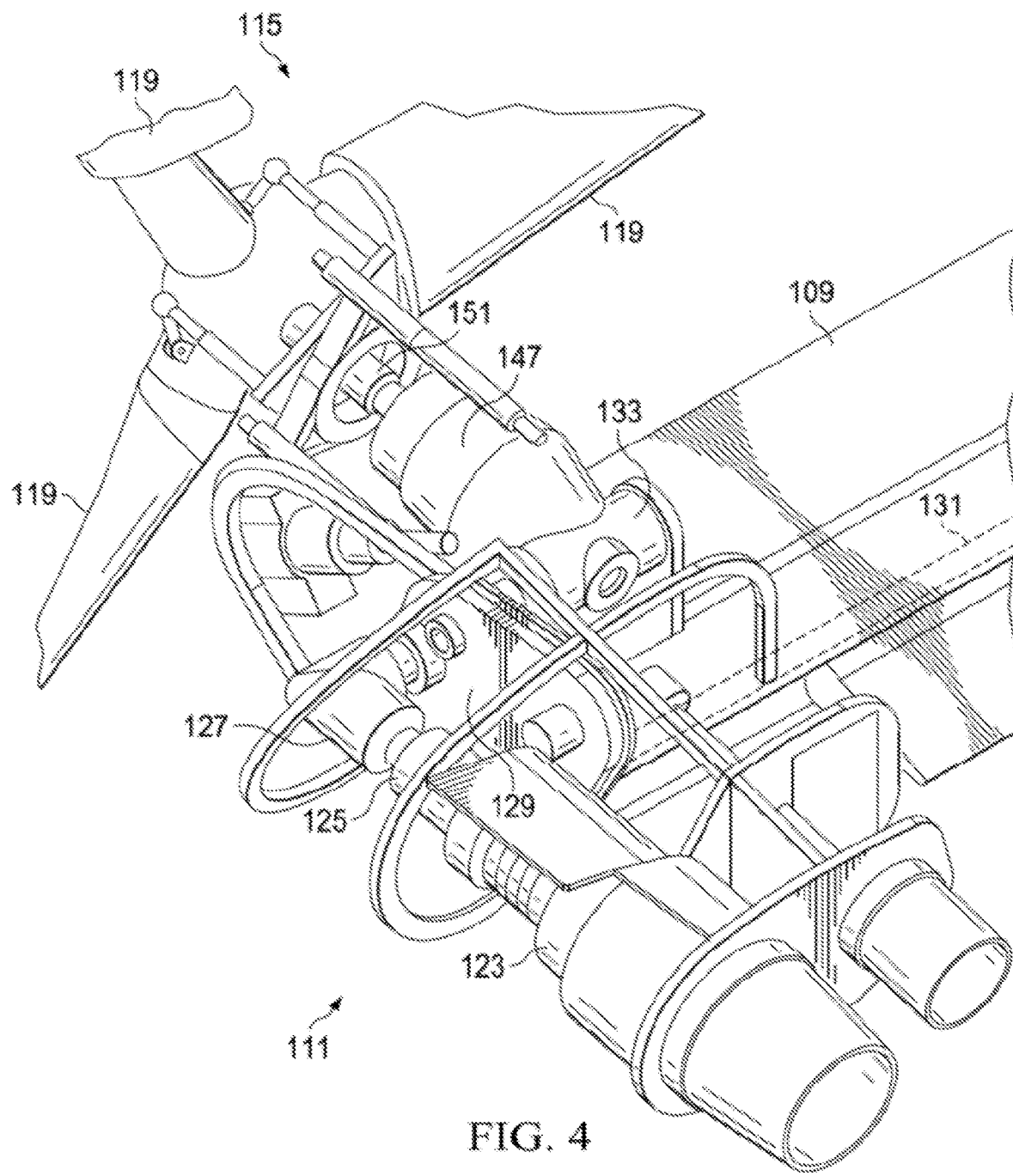
FIG. 4 shows a perspective view of a drive system of a tiltrotor aircraft, in accordance with some embodiments of the present disclosure.

FIG. 4 shows a perspective view of the drive system 111 of the tiltrotor aircraft 100 of FIGS. 1A and 1B, in accordance with some embodiments of the present disclosure. The drive system 111 includes a fixed engine 137 that is fixed relative to the wing 109. The fixed engine 137 transfers power to the proprotor 115 and several auxiliary systems via a gearbox 129. An engine output shaft 125 transfers power from the fixed engine 137 to a spiral bevel gearbox 127 that includes spiral bevel gears to change torque direction by 90 degrees from the fixed engine 137 to the gearbox 129 via a clutch. The gearbox 129 includes a plurality of gears in a gear train that are coupled to a spindle gearbox 133, an interconnect drive shaft 131, and auxiliary systems including a lubrication system pump, a blower gearbox, a generator, and a hydraulic pump. Torque is transferred to an input in a spindle gearbox 133 of proprotor gearbox 147. The proprotor gearbox 147 can include a plurality of gears that can be configured to transfer power and reduce rotational speed to a mast 151, which rotates the rotor blades 119.

Gears, bearings, and other mechanical components of drive system 111 are subject to wear and heat generation due to contact with other components. These mechanical components may be lubricated to reduce friction and transfer heat away from the components. Lubrication is the process or technique employed to reduce wear of one or both surfaces in close proximity, and moving relative to each other, by interposing a substance, such as a lubricant, between the surfaces to help carry the load (pressure generated) between the opposing surfaces and to help transfer heat away from the surfaces. The drive system 111 is an example of the drive system 300 and, therefore, includes a hybrid lubrication system as described with respect to FIG. 3; further details of the hybrid lubrication system are described below.

Figure 5A:
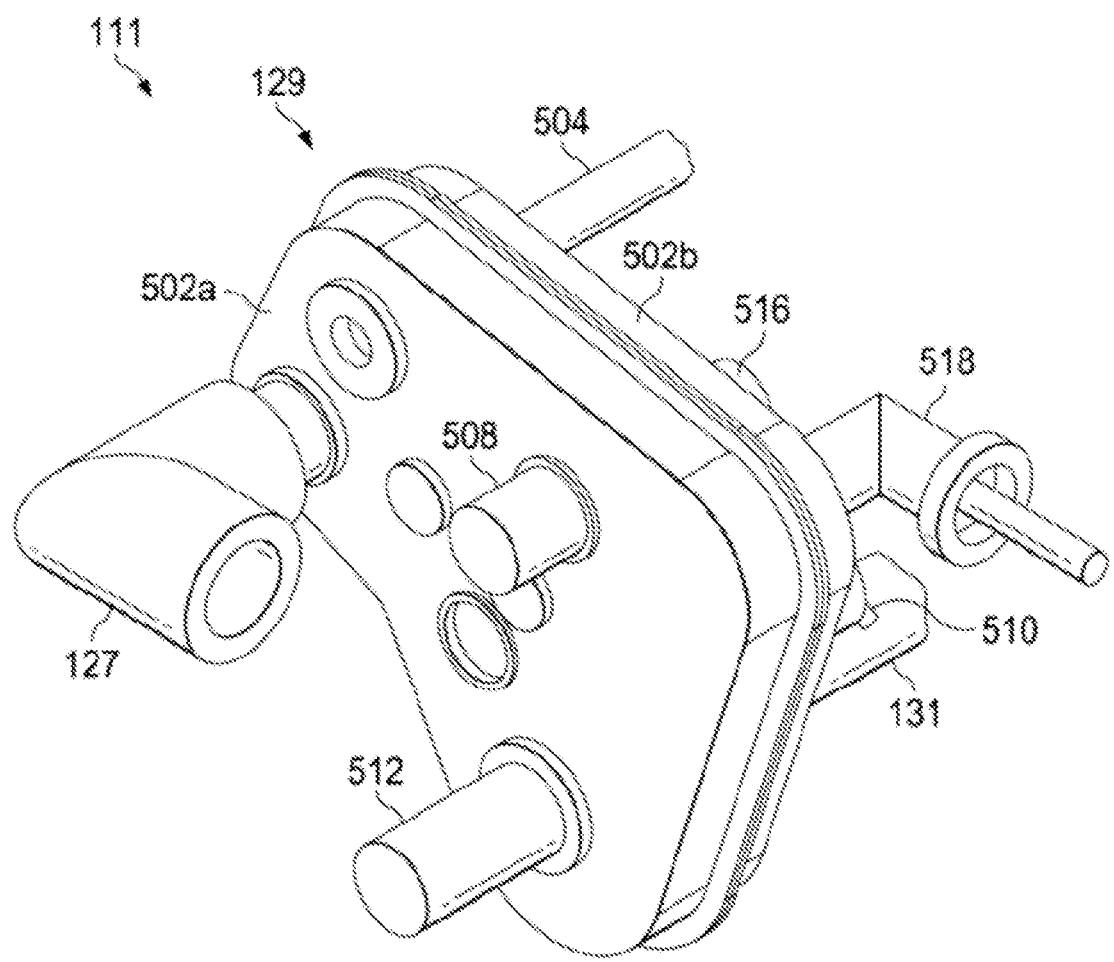
FIGS. 5A, 5B, 5C, 5D, and 6 illustrate a system including a hybrid lubrication system for lubricating a gearbox on an aircraft, in accordance with some embodiments of the present disclosure.
Figure 6:
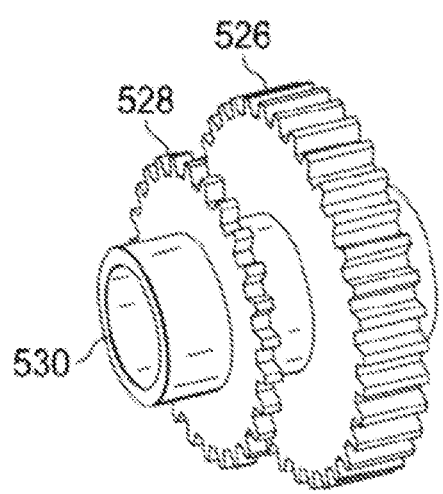
Figure 5B:
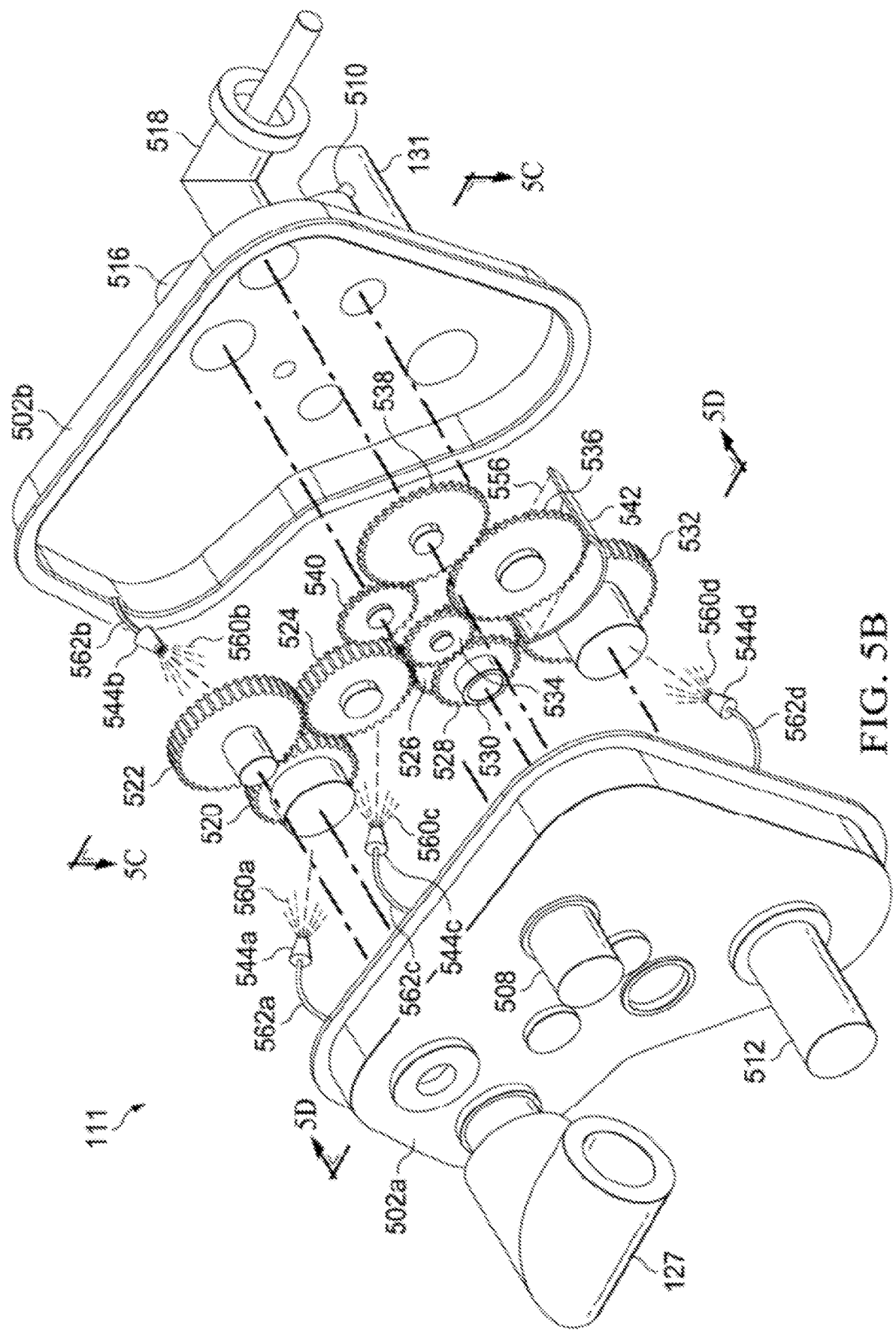
Figure 5C:
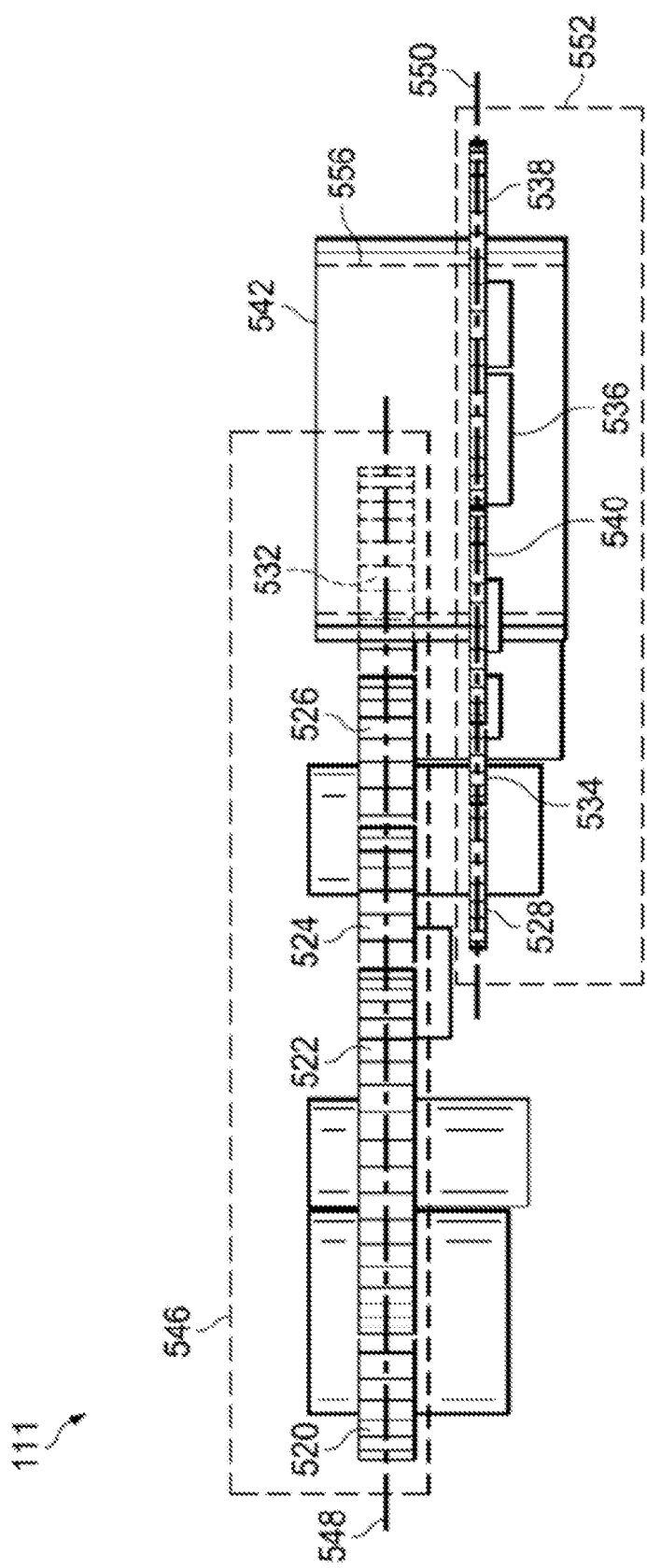
Figure 5D:
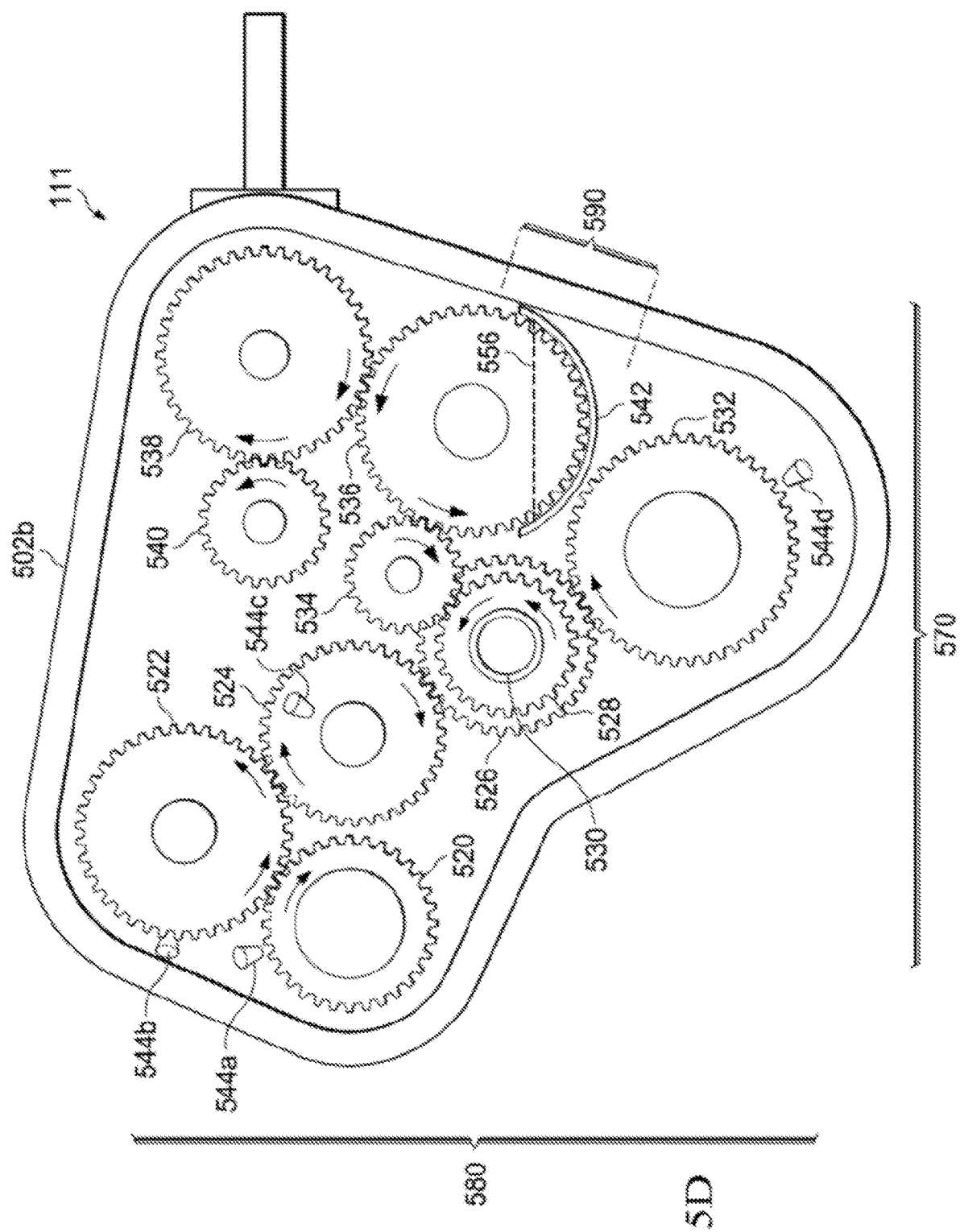

FIGS. 5A, 5B, 5C, 5D, and 6 illustrate further details of a portion of the drive system 111 including the gearbox 129, in accordance with some embodiments of the present disclosure. FIG. 5A is perspective view of the portion of the drive system 111 where the gearbox 129 is assembled. FIG. 5B is partially exploded view of the portion of the drive system 111. FIG. 5C is a top view of gears in a gear train within the gearbox 129 as generally indicated by the arrows labeled "5C" in FIG. 5B. FIG. 5D is front view of the gears in the gear train within the gearbox 129 with a portion of the housing removed as generally indicated by the arrows labeled "5D" in FIG. 5B. FIG. 6 illustrates further details of a compound gear of the drive system 111.

The drive system 111 includes the gearbox 129, which is coupled to and transmits power to each of the spiral bevel gearbox 127, a lubrication system pump 512, a driveshaft 504, a generator output 516, a blower gearbox 518, a hydraulic pump output 510, and an interconnect drive shaft 131. The lubrication system pump 512 generates pressure to pump a lubricant through a pressurized lubrication system. The driveshaft 504 is coupled to the spindle gearbox 133 and outputs power that is transmitted to the rotor blades. The generator output 516 powers a generator such as a direct current (DC) generator for supplying electrical power to components onboard an aircraft. The blower gearbox 518 can be mounted to interconnect gearbox 412 and can be configured to provide torque to the oil cooler blower fan, which may be used to draw in air for lubricant temperature reduction. The hydraulic pump output 510 can provide hydraulic power, e.g., for a control system such a cyclical and/or collective flight controls. The interconnect drive shaft 131 can be configured to provide a torque path that enables a single engine to provide torque to both drive systems 111 and 113 in the event of a failure of one of the engines 137 and 139.

The gearbox 129 includes a housing comprising housing portions 502a and 502b, which are attached to another to enclose the gears of the gear train that provide power to the aforementioned systems. The housing portions 502a and 502b form a cavity surrounding the gear train. The gear train includes gears 520, 522, 524, 526, 532, 528, 534, 536, 538, and 540. Each of the gears includes a gear shaft about which the gear rotates and a plurality of teeth that are operable to mate with one or more adjacent gears to transfer power between one another. As is shown, for example, in FIGS. 5B and 5D, the gears within the gearbox are lubricated using a hybrid lubrication system 570. The hybrid lubrication system 570 includes a pressurized lubrication system 580 and a non-pressurized lubrication system 590. FIG. 5C shows, among other things, that the gears in the gear train are organized into two gear trains 546 and 552, which operate in parallel with one another. The gear trains include different sets of gears. The gear train 546 includes the gears 520, 522, 524, 526, and 534 each of which is aligned on an axis 548. The gear train 552 includes the gears 520, 522, 524, 526, and 534 each of which is aligned on an axis 550. Each gear in the gear train 546 is operable to mesh only with other gears in the gear train 546 and each gear in the gear train 552 is operable to mesh only with other gears in the gear train 552. The gear shaft 530 couples the parallel rotation of the sets of gears in the gear trains 546 and 552.

During operation, the gears transmit power between one another based on receiving torque which causes the gear to rotate. FIG. 5D includes arrows overlaid on each of the gears to illustrate an example operation of the gears in the gearbox 129. The gear 520 is an engine input gear that receives power (via torque causing rotation) from the fixed engine 137 and transmits the power to the gear 522. The gear 522 is an output gear that transmits power to the driveshaft 504 for rotating the rotor blades and also transmits power to the gear 524. The gear 524 is an idler gear that transmits power to the gear 526 on a compound gear. FIG. 6 illustrates the compound gear, which includes the gears 526 and 528 each of which is an idler gear and is coupled to a gear shaft 530. Thus, as the gear 526 receives power from the gear 524, the power is transmitted to the gear 532 and through the gear shaft 530 to the gear 528. The gear 532 transmits power to the interconnect drive shaft 131. The gear 528 transmits power to the gear 534, which is an idler gear. The gear 534 transmits power to the gear 536. The gear 536 transmits power to the hydraulic pump output 510, which is an auxiliary system, and to the gear 538. The gear 538 transmits power to the blower gearbox 518 and to the gear 540. The gear 540 transmits power to the generator output 516.

The hybrid lubrication system 570 of FIG. 5D lubricates the gears using the pressurized lubrication system 580 and the non-pressurized lubrication system 590. The pressurized lubrication system 580 is an active system that requires direct power to maintain the pressure in the system to propel the lubricant. The non-pressurized lubrication system 590 is a passive system that relies on the movement of the gears to disperse the lubricant and does not require direct power to propel the lubricant. The pressurized lubrication system 580 includes nozzles 544a, 544b, 544c, and 544d each of which is operable to spray a lubricant onto the gears supplied through the pressurized tubes 562a, 562b, 562c, and 562d, respectively; portions of the lubricant sprayed by the nozzles are labeled 560a, 560b, 560c, and 560d in the FIG. 5B. The nozzle 544a is directed toward the gear 520 and sprays the lubricant on the gear 520. The nozzle 544b is directed toward the gear 522 and sprays the lubricant 560b on the gear 522. The nozzle 544c is directed toward the gear 524 and sprays the lubricant 560c on the gear 524. The nozzle 544d is directed toward the gear 532 and sprays the lubricant 560d on the gear 532. A centerline of each of the nozzles 544a, 544b, 544c, and 544d intersects each of the gears 520, 522, 524, and 532, respectively and no obstructions lie between the nozzle and the corresponding gear. As the nozzles 544a-d spray the gears with the lubricant, some of the lubricant may travel to other locations in the gearbox 129. For example, a field of spray of a nozzle may be larger than the corresponding gear, which can cause an overspray to reach other locations in the gearbox 129. As another example, the lubricant when sprayed at the gear in a pressurized stream may reflect off a gear and land in other locations in the gearbox 129. The non-pressurized lubrication system includes a reservoir 542, which is operable to catch a portion of the lubricant in a pool 556 from the pressurized lubrication system. The reservoir 542 is a curved plate that spans between opposing faces of walls of the housing portions 502a and 502b and creates cavity in which the lubricant can pool. The reservoir 542 is proximate to the gear 536 and follows the curvature of the gear 536. In some embodiments, reservoir 542 is offset from the gear 536 by a fraction of a centimeter (e.g., 0.1 cm, 0.25 cm, 0.5 cm. 0.75, cm). The reservoir 542 surrounds only a portion of the gear 536. A height of the reservoir 542 is a fraction of the height of the gear 536. As illustrated in the Figures, the reservoir 542 is approximately ⅓ the height of the gear 536. The reservoir 542 comprises a rigid, planar material such as metal and/or a composite material. The gear 536 moves through the pool 556 of the lubricant. The gear 536 is operable to disperse the lubricant onto others of the gears based on rotating through the portion of the lubricant. Because teeth of the gear 536 mesh with teeth on the gears 534 and 538, any lubricant picked up by the gear 536 moving through the pool can be transferred to the gears 534 and 538 based on direct contact. These gears can, in turn, transfer the lubricant to the gears 528 and 540. During operation, the gear 536 may rotate at or above about 6,000 RPM. The gear 536 entering the pool 556 of lubricant at such a speed can cause the lubricant to splash out of the pool 556 and onto others of the gears in its gear train 552. In addition, gear 536 exiting the pool 556 of lubricant at such a speed can throw the lubricant outwardly from the gear (e.g., based on centrifugal force) onto others of the gears in its gear train 552.

Figure 7A:
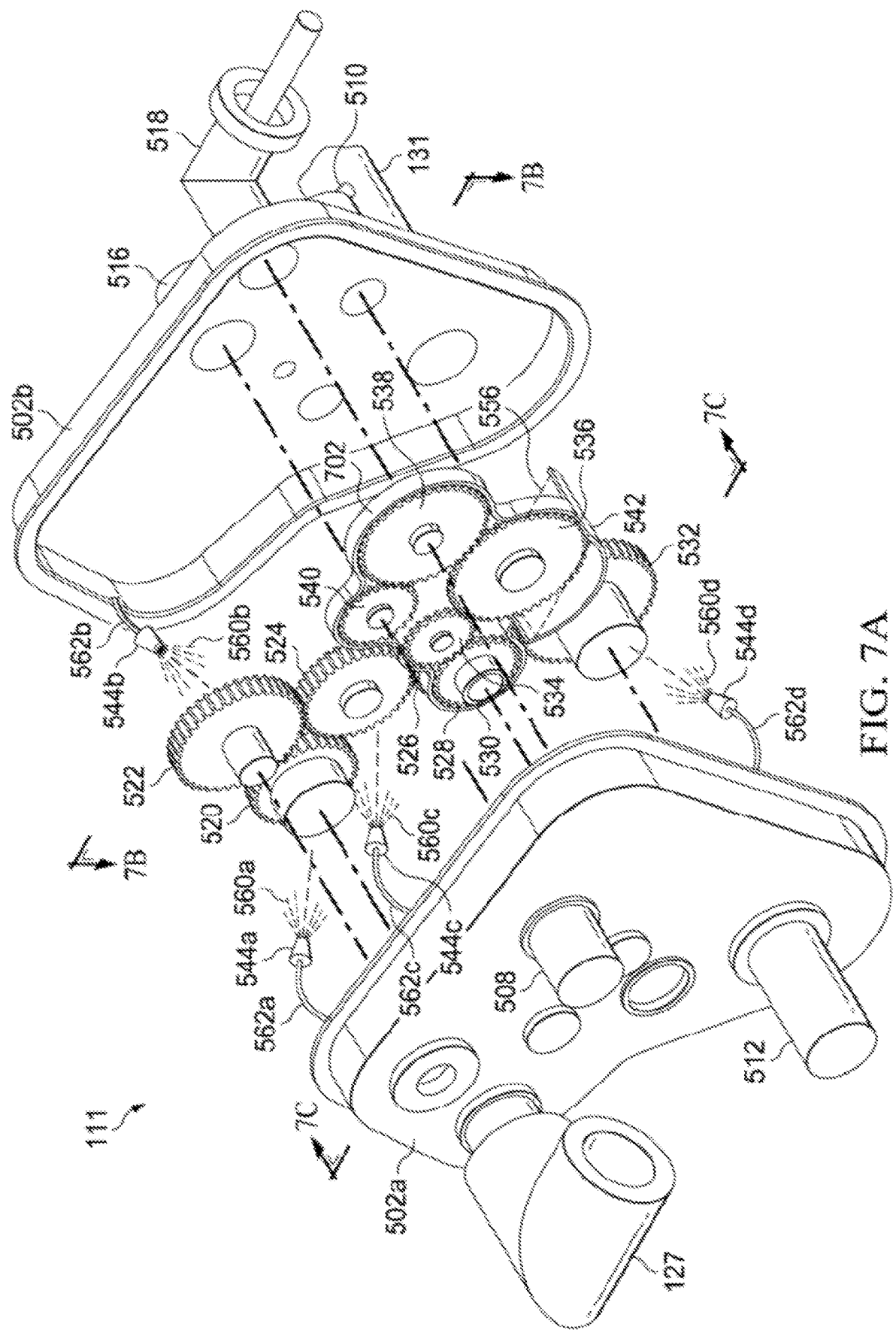
FIGS. 7A, 7B, and 7C illustrate another system including a hybrid lubrication system for lubricating a gearbox on an aircraft, in accordance with some embodiments of the present disclosure.
Figure 7B:
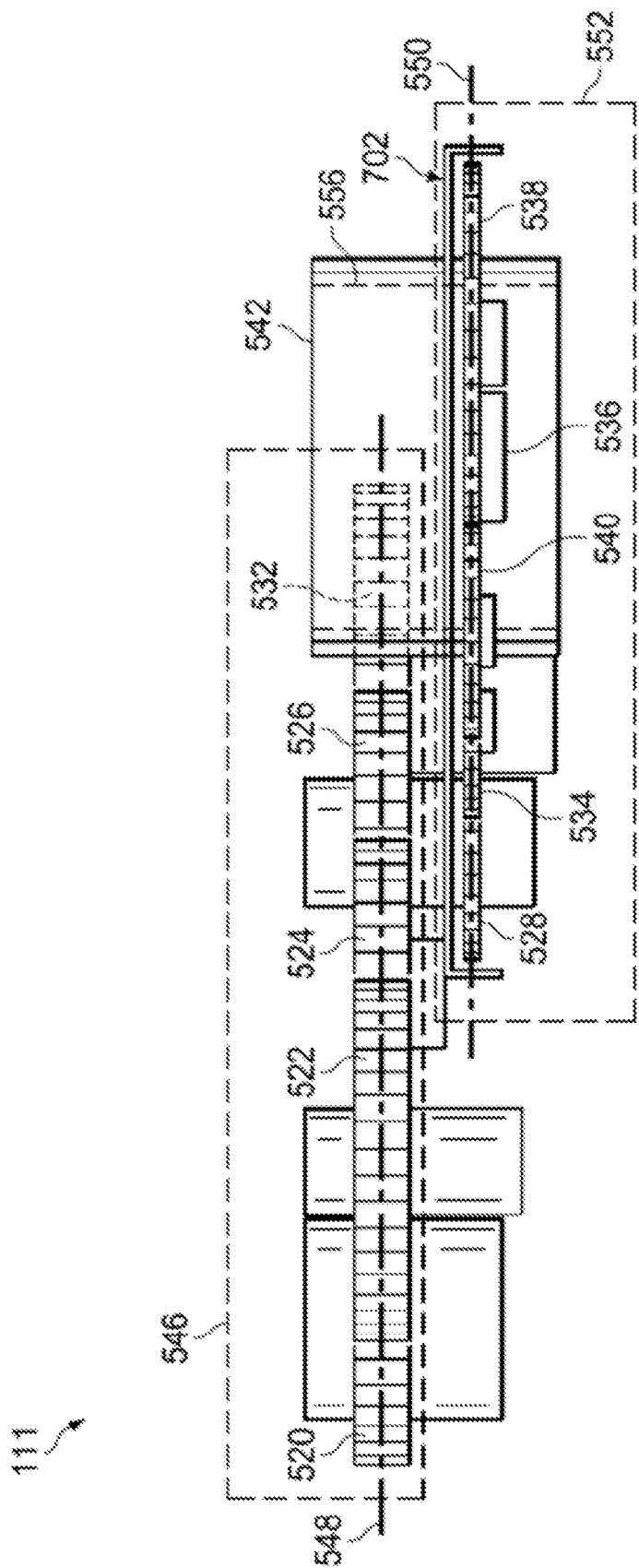
Figure 7C:
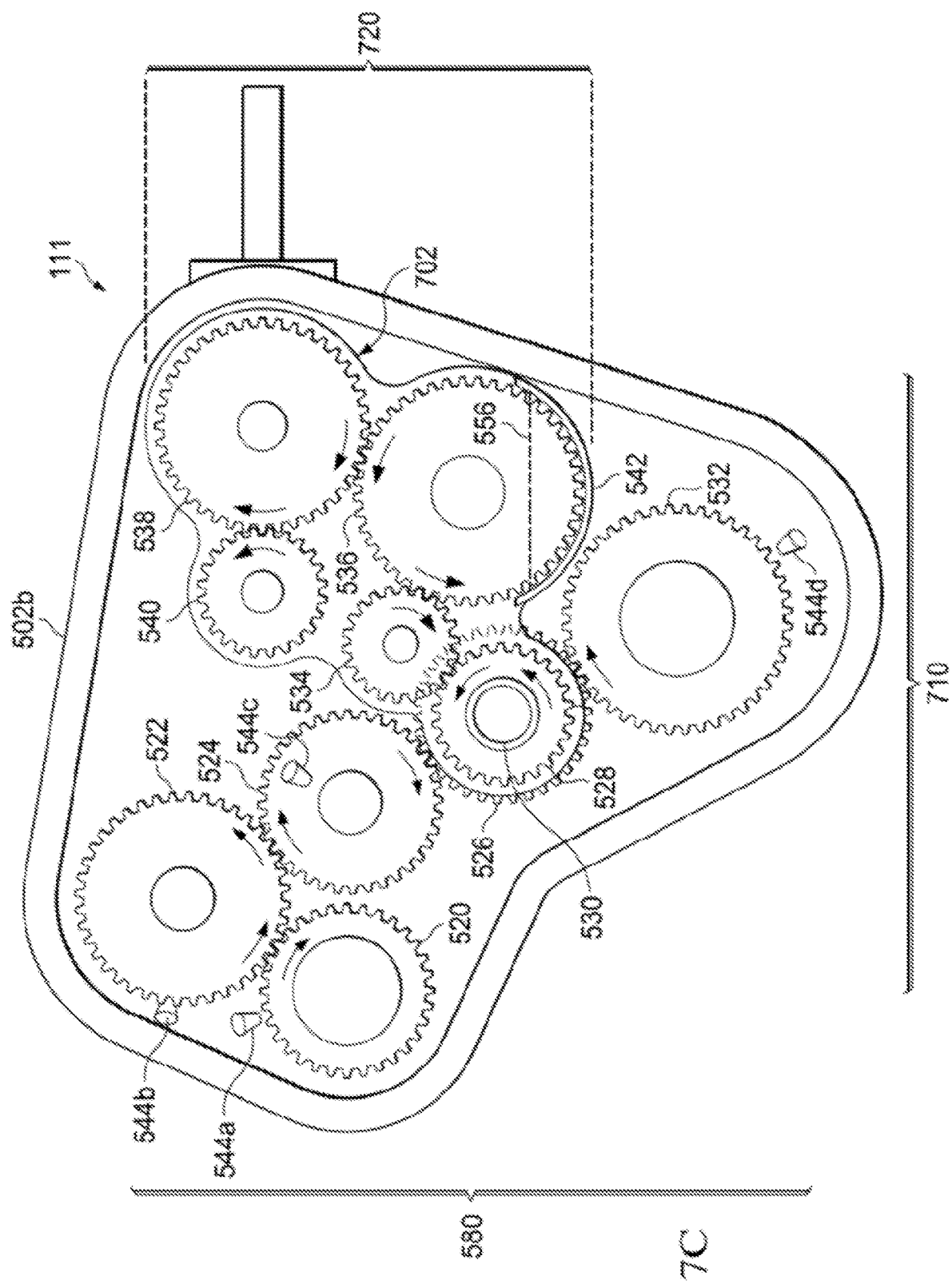

FIGS. 7A, 7B, and 7C illustrate further details of a portion of the drive system 111, in accordance with some embodiments of the present disclosure. FIG. 7A is partially exploded view of the portion of the drive system 111. FIG. 7B is a top view of gears in a gear train within the gearbox 129, as generally indicated by the arrows labeled "7B" in FIG. 7A. FIG. 7C is front view of the gears in the gear train within the gearbox 129 with a portion of the housing removed, as generally indicated by the arrows labeled "7C" in FIG. 7A. The drive system 111 is described with respect to FIGS. 5A, 5B, 5C, 5D, and 6; the description is not repeated here only for the sake of brevity. As is shown in FIGS. 7A and 7C, the gears within the gearbox are lubricated using a hybrid lubrication system 710. The hybrid lubrication system 710 includes a pressurized lubrication system 580 (as described with respect to FIGS. 5A, 5B, 5C, 5D) and a non-pressurized lubrication system 720. A difference between the hybrid lubrication system 710 of FIGS. 7A, 7B, and 7C and the hybrid lubrication system 570 of FIGS. 5A, 5B, 5C, 5D is that the non-pressurized lubrication system 720 in the hybrid lubrication system 710 includes a shroud 702 while the non-pressurized lubrication system 590 in the hybrid lubrication system 570 lacks such a shroud. The shroud 702 confines the lubricant (from the pool 556 of the lubricant) as it is dispersed from the reservoir 542 onto the gears in the gear train 552. This keeps the lubricant inside the gearbox 302 even during and after LOL.

The shroud 702 confines the lubricant from the pool 556 as it is dispersed from the reservoir 542 by the gear 536. The shroud 702 can help the reservoir 542 to catch the pool 556 of the lubricant from the pressurized lubrication system 580. For example, overspray of lubricant from the pressurized lubrication system 580 can reach an outer surface of the shroud 702. The lubricant can drip down the outer surface of the shroud 702 to the reservoir 542 where it can collect and form the pool 556 of the lubricant. In addition, the shroud 702 can help to reserve the pool 556 of the lubricant for use in the non-pressurized lubrication system 720 and separate it from the pressurized lubrication system 580. As the gear 536 rotates through the pool 556 of the lubricant, it can be thrown in all directions around the gear 536 enabling it to reach other gears in the gear train 552. In turn, the other gears in the gear train 552 may throw some of the lubricant in all directions around each gear. The shroud 702 can prevent the pool 556 of the lubricant from being ejected from the non-pressurized lubrication system 720 due to being thrown from the gears in the gear train 552. An inner surface of the shroud 702 is a barrier that can catch lubricant thrown from the gears in the gear train 552. The lubricant can drip down the inner surface of the shroud 702 back to the reservoir 542, where it can be repeatedly used by the non-pressurized lubrication system 720. Because the shroud 702 retains the pool 556 of the lubricant within the non-pressurized lubrication system 720 and separate from the pressurized lubrication system 580, the non-pressurized lubrication system 720 can continue to lubricate the gears in the gear train 552 during a LOL in the pressurized lubrication system 580. The pool 556 of the lubricant can remain within the safety of the shroud 702 (and accessible for use by the non-pressurized lubrication system 720) even after the pressurized lubrication system 580 runs out of lubricant. In some examples, the non-pressurized lubrication system 720 can continue to operate for over 30 minutes after the pressurized lubrication system 580 runs out of lubricant.

Figure 8:
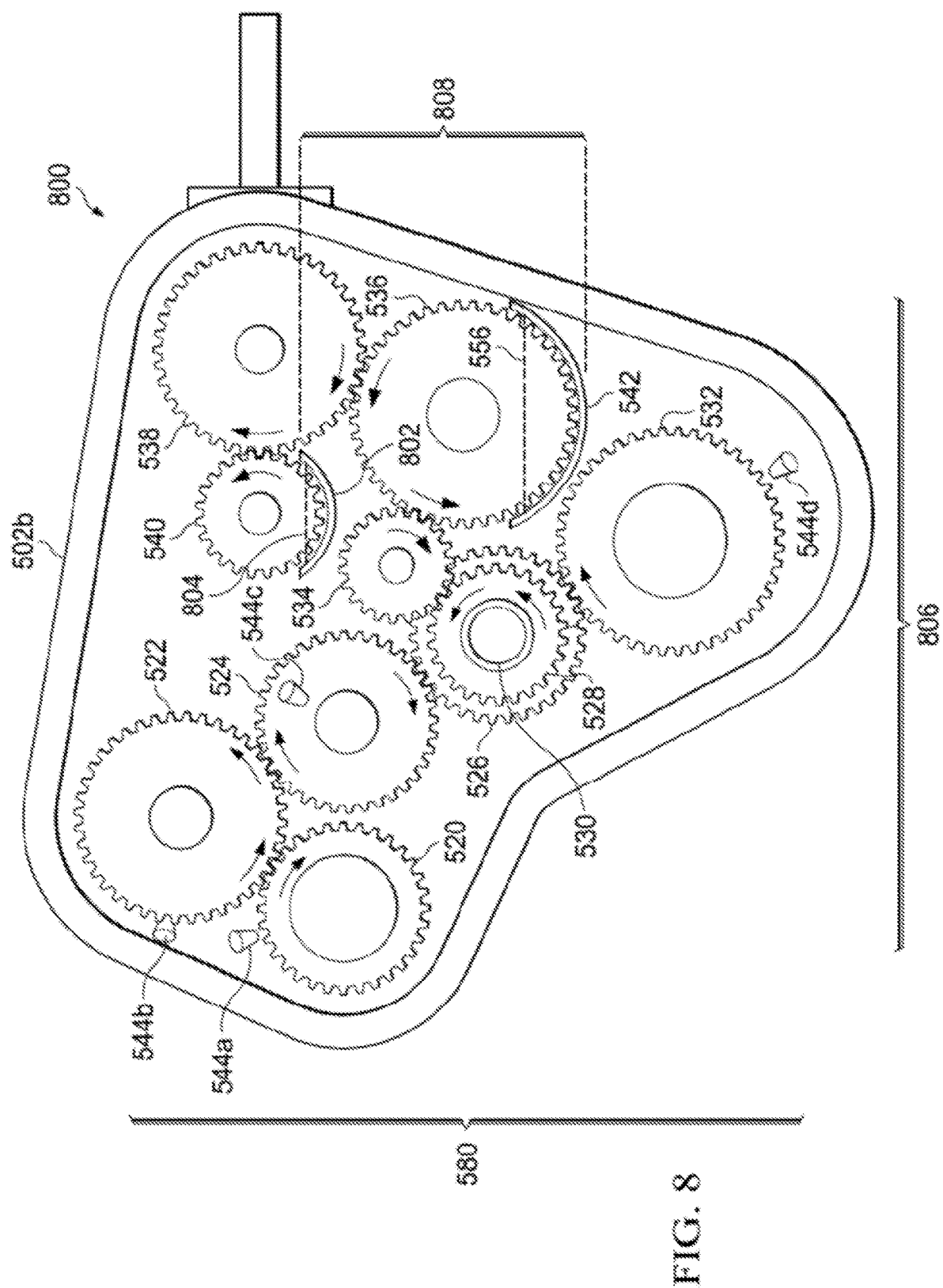
FIGS. 8 and 9 illustrate other systems including a hybrid lubrication system for lubricating a gearbox on an aircraft, in accordance with some embodiments of the present disclosure.

FIG. 8 illustrates a portion of a drive system 800, which includes a hybrid lubrication system 806 for lubricating a gearbox on an aircraft, in accordance with some embodiments of the present disclosure. The drive system 800 is an example of the drive system 111 described with respect to FIGS. 5A, 5B, 5C, 5D, and 6 and includes many of the same components are described for those Figures; the description of these components (e.g., the gears, hybrid lubrication system) is not repeated here only for the sake of brevity. The view of FIG. 8 is similar to the view illustrated in FIG. 5D. The drive system 800 includes a hybrid lubrication system 806 comprising a pressurized lubrication system 580 (as described with respect to FIGS. 5A, 5B, 5C, and 5D) and a non-pressurized lubrication system 808. A difference between the hybrid lubrication system 806 of FIG. 8 and the hybrid lubrication system 570 of FIGS. 5A, 5B, 5C, and 5D is that the non-pressurized lubrication system 590 in the hybrid lubrication system 570 includes one reservoir while the non-pressurized lubrication system 808 in the hybrid lubrication system 806 includes two reservoirs. The hybrid lubrication system 806 includes reservoirs 802 and 542. The lubricant from the pressurized lubrication system collects in the reservoirs 802 and 542, in pools 804 and 556, respectively. The pools 804 and 556 directly lubricate the gears 540 and 536, respectively. The reservoir 802 is a curved plate that spans between walls of the housing portions and creates cavity in which the lubricant can pool. The reservoir 802 is proximate the gear 540 and follows the curvature of the gear 540. In some embodiments, reservoir 802 is offset from the gear 540 by a fraction of a centimeter. A height of the reservoir 802 is a fraction of the height of the gear 540. During operation, the gear 540 may rotate at or above about 10,000 RPM. The gear 540 entering the pool 804 of lubricant at such as speed can cause the lubricant to splash out of the pool 904 and onto others of the gears in its gear train 552. In addition, gear 940 exiting the pool 804 of lubricant at such as speed can throw the lubricant outwardly from the gear (e.g., based on centrifugal force) onto others of the gears in its gear train 552. Because both of the reservoirs 902 and 542 can collect lubricant, the gears may be more efficiently by the passive location system. Moreover, a lubricant carrying-capacity of the non-pressurized lubrication system increases with the number and size of the reservoirs. Thus, the increased number of reservoirs increases the lubricant carrying capacity of the drive system 800 relative to that of the drive system 111 and can enable it to survive a longer period of time when LOL occurs.

Figure 9:
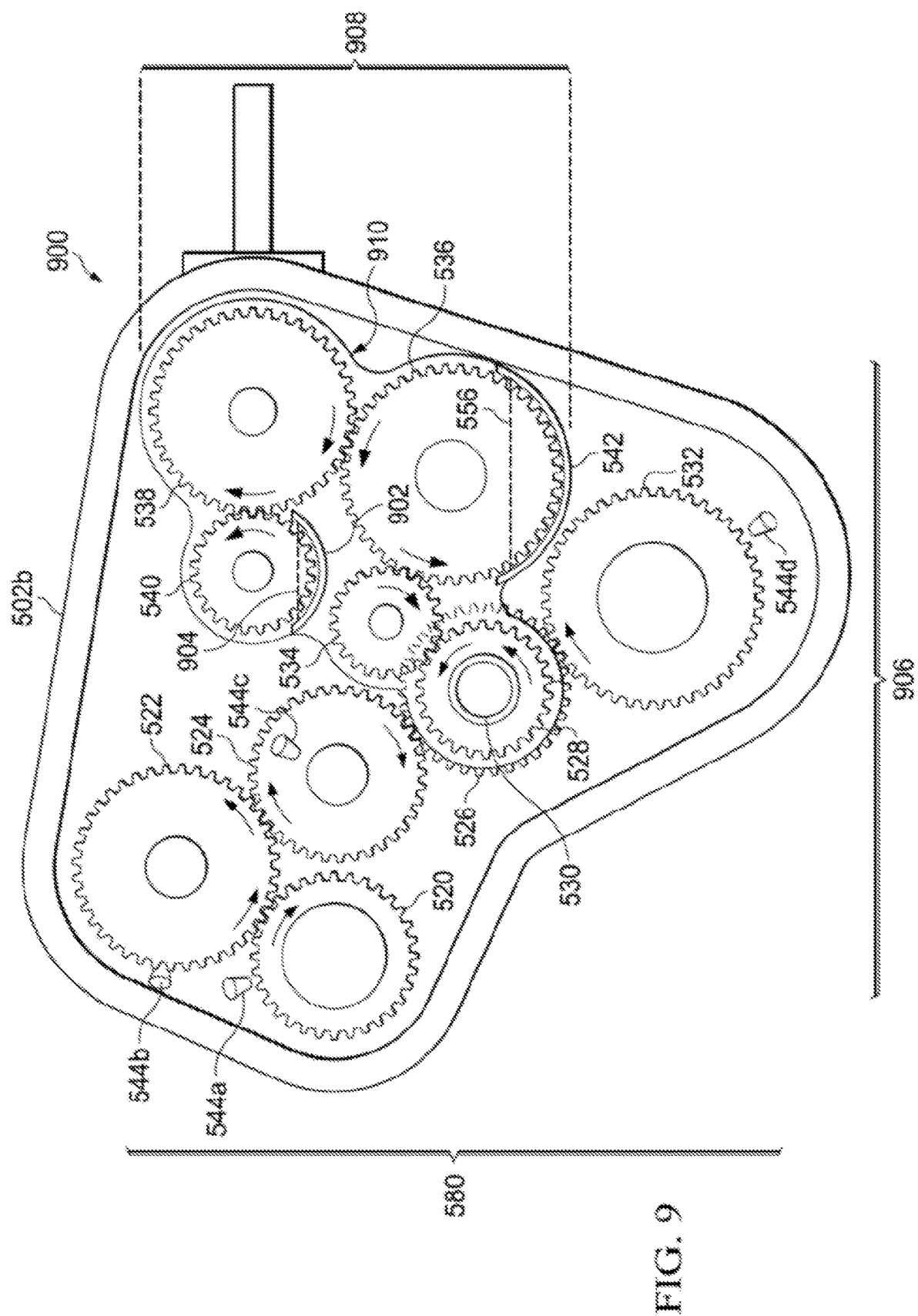

FIG. 9 illustrates a portion of a drive system 900, which includes a hybrid lubrication system 906 for lubricating a gearbox on an aircraft, in accordance with some embodiments of the present disclosure. The drive system 900 is an example of the drive system 111 described with respect to FIGS. 7A, 7B, and 7C and includes many of the same components are described for those Figures; the description of these components (e.g., the gears, hybrid lubrication system) is not repeated here only for the sake of brevity. A difference between the hybrid lubrication system 906 of FIG. 9 and the hybrid lubrication system 710 of FIGS. 7A, 7B, and 7C is that the non-pressurized lubrication system 720 in the hybrid lubrication system 710 includes one reservoir while the non-pressurized lubrication system 908 in the hybrid lubrication system 906 includes two reservoirs. The hybrid lubrication system 906 includes reservoirs 902 and 542. The lubricant from the pressurized lubrication system collects in the reservoirs 902 and 542, in pools 904 and 556, respectively. The reservoir 902 operates in a manner as described for the reservoir 802 of FIG. 8; the description is not repeated here only for the sake of brevity.

In addition, the system 900 of the FIG. 9 is similar to the system 800 of the FIG. 8. A difference between the system 800 of the FIG. 8 and the system 900 of the FIG. 9 is that the system 900 of the FIG. 9 includes a shroud 910 in the non-pressurized lubrication system 908 while the system 800 of the FIG. 8 lacks such a shroud. The shroud 910 can confine the lubricant from the pools 556 and 904 as it is dispersed from the reservoirs 542 and 902 by the gears 536 and 540. The shroud 910 operates in a manner as described for the shroud 702 of FIGS. 7A, 7B, and 7C; the description is not repeated here only for the sake of brevity.

The example reservoir configurations illustrated in the embodiments of FIGS. 5A, 5B, 5C, 5D, 7A, 7B, 7C, 8 and 9 are only a few of the many reservoir configurations that may be provided for a hybrid lubrication system. Virtually any other reservoir configuration for a hybrid lubrication may be provided and, thus, are clearly within the scope of the present disclosure.

Figure 10:
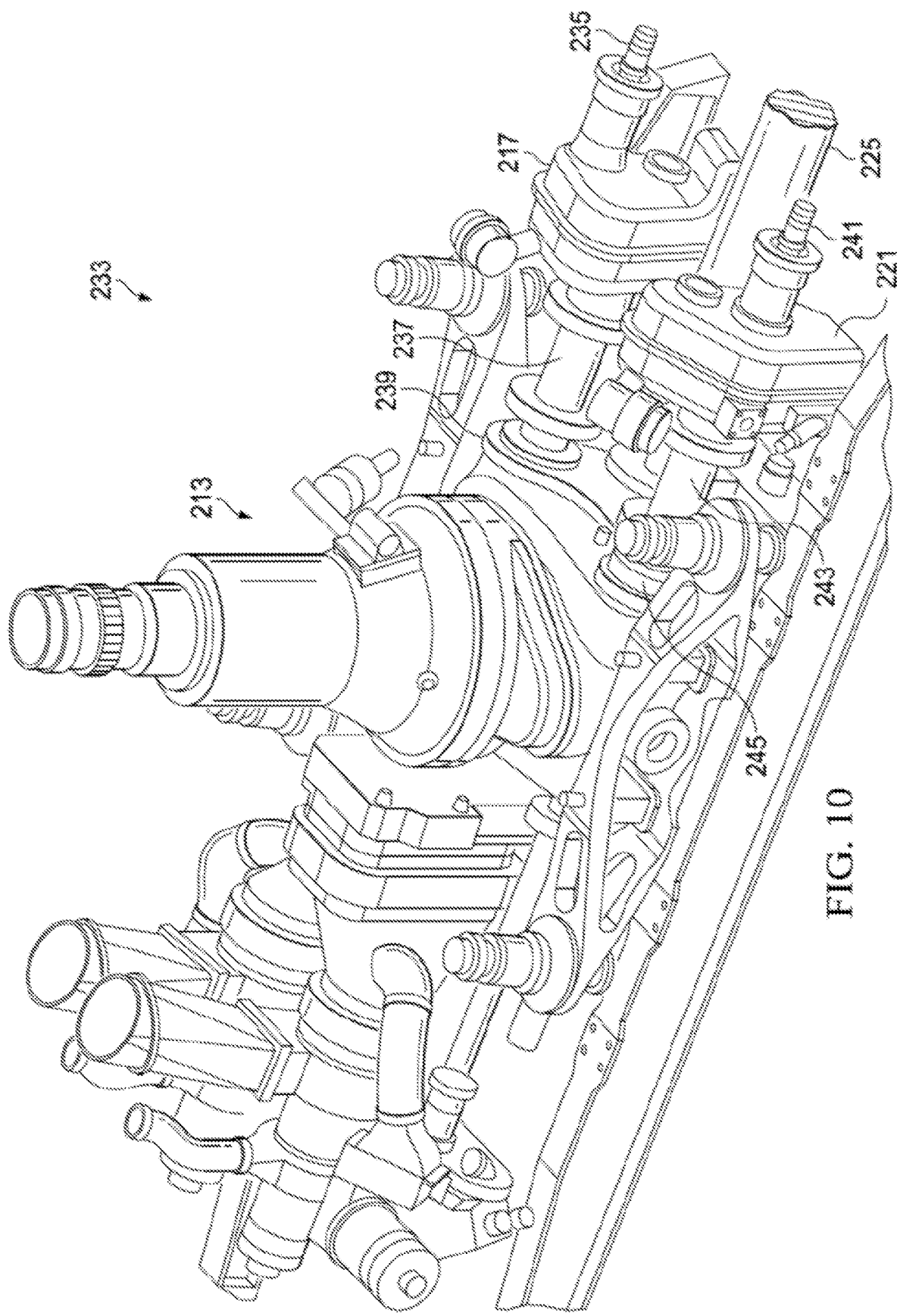
FIGS. 10 and 11 show a perspective view of a drive system of a rotorcraft, in accordance with some embodiments of the present disclosure.
Figure 11:
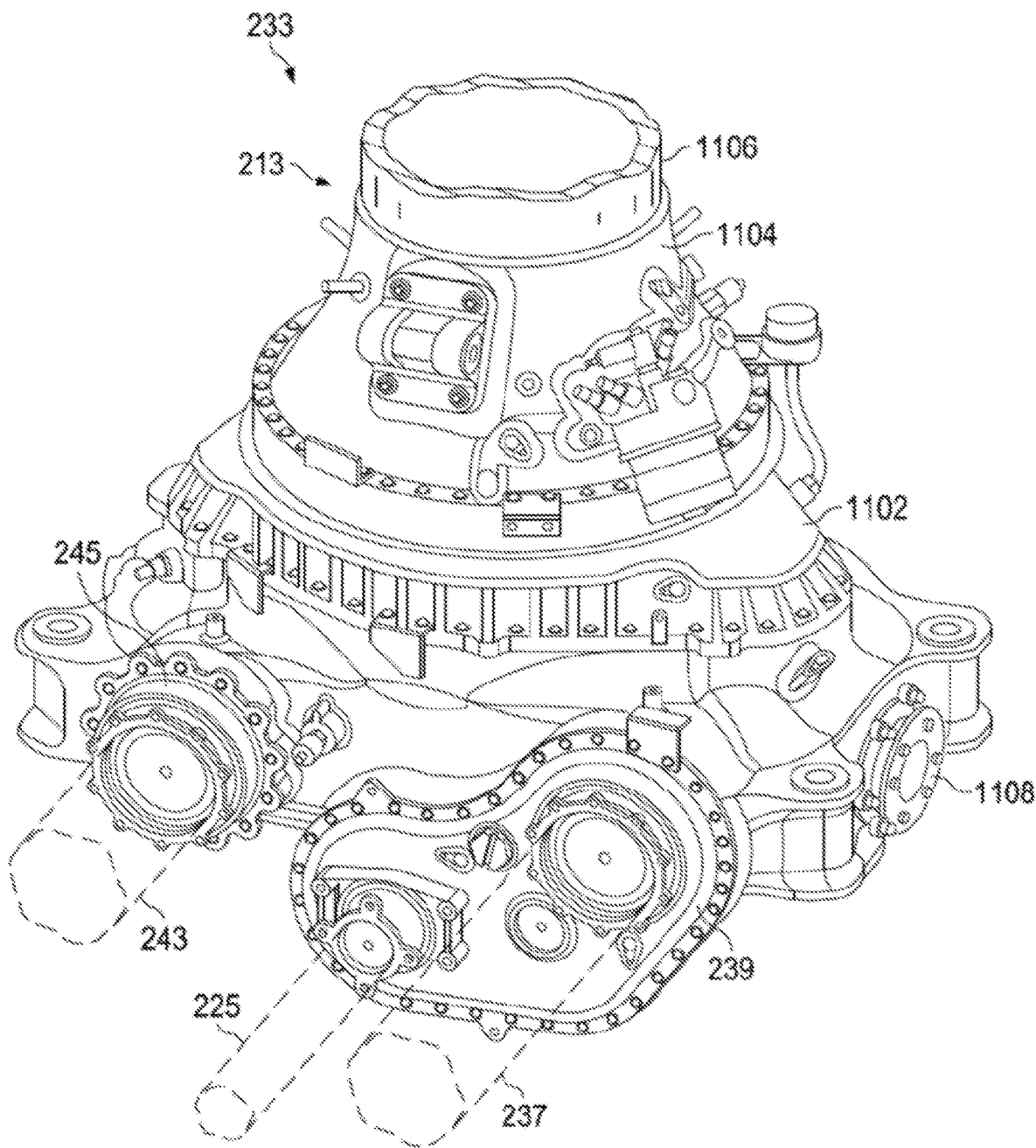

FIG. 10 shows an isometric view of the drive system 233 of the rotorcraft 200 of FIGS. 2A and 2B, in accordance with some embodiments of the present disclosure. The drive system 233 includes two engine reduction gearboxes 217 and 221, that are each depicted with an engine connection driveshaft 235 and 241, respectively. Each of the engine reduction gearboxes 217 and 221 is connected via a separate driveshafts 237 and 243 to the main rotor gearbox 213. Thus, each of the driveshafts 237 and 243 provides a single drive system from the engines to the main rotor gearbox 213, each of which operates independently and redundantly to provide power to the main rotor gearbox 213. Further, each of the engine reduction gearboxes 217 and 221 reduces the speed of rotation from the engine (e.g., up to a high speed at or near turbine engine speed of greater than 10,000 RPM) to a speed substantially lower than the high speed, a low speed of less than about 6,000 RPM prior to entering the main rotor gearbox 214. The driveshafts 237 and 243 can include one- or multiple-piece driveshaft and can comprise a single material or a composite material. FIG. 11 illustrates further details of the main rotor gearbox 213. The main rotor gearbox 214 includes a lower housing 1102, a middle housing 1104, and a mast housing 1106, covers 245 and 239, and generator output 1108. The covers 245 and 239 are selectively attachable and/or detachable to reveal and/or cover some gears and gear assemblies. The cover 245 encloses a gear coupling the driveshaft 243 to the engine reduction gearbox 221. The cover 239 encloses a tail rotor gear assembly and a gear coupling the driveshaft 237 to the engine reduction gearbox 217.

Figure 12:
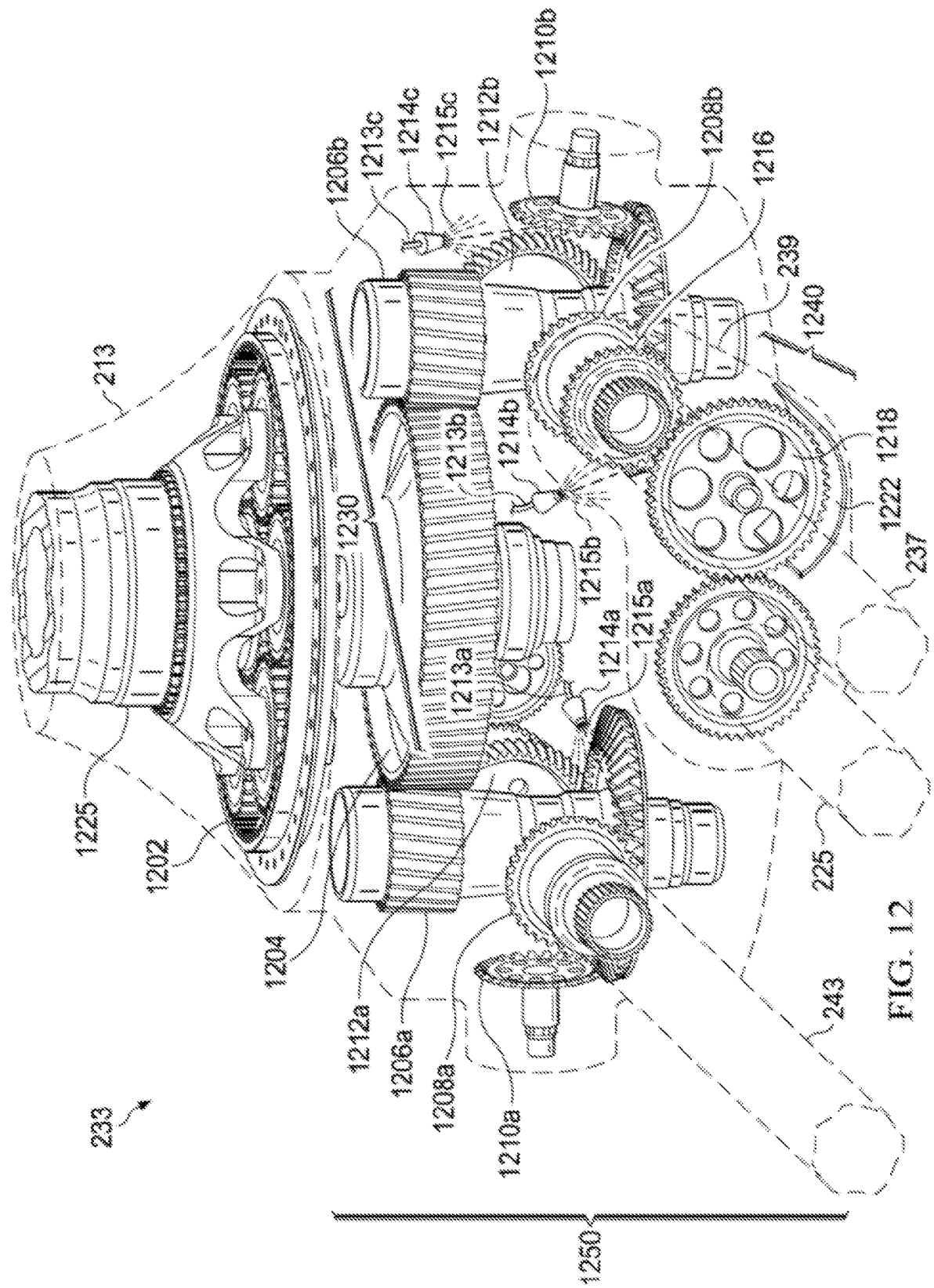
FIGS. 12 and 13 illustrate a system including a hybrid lubrication system for lubricating a gearbox on an aircraft, in accordance with some embodiments of the present disclosure.
Figure 13:
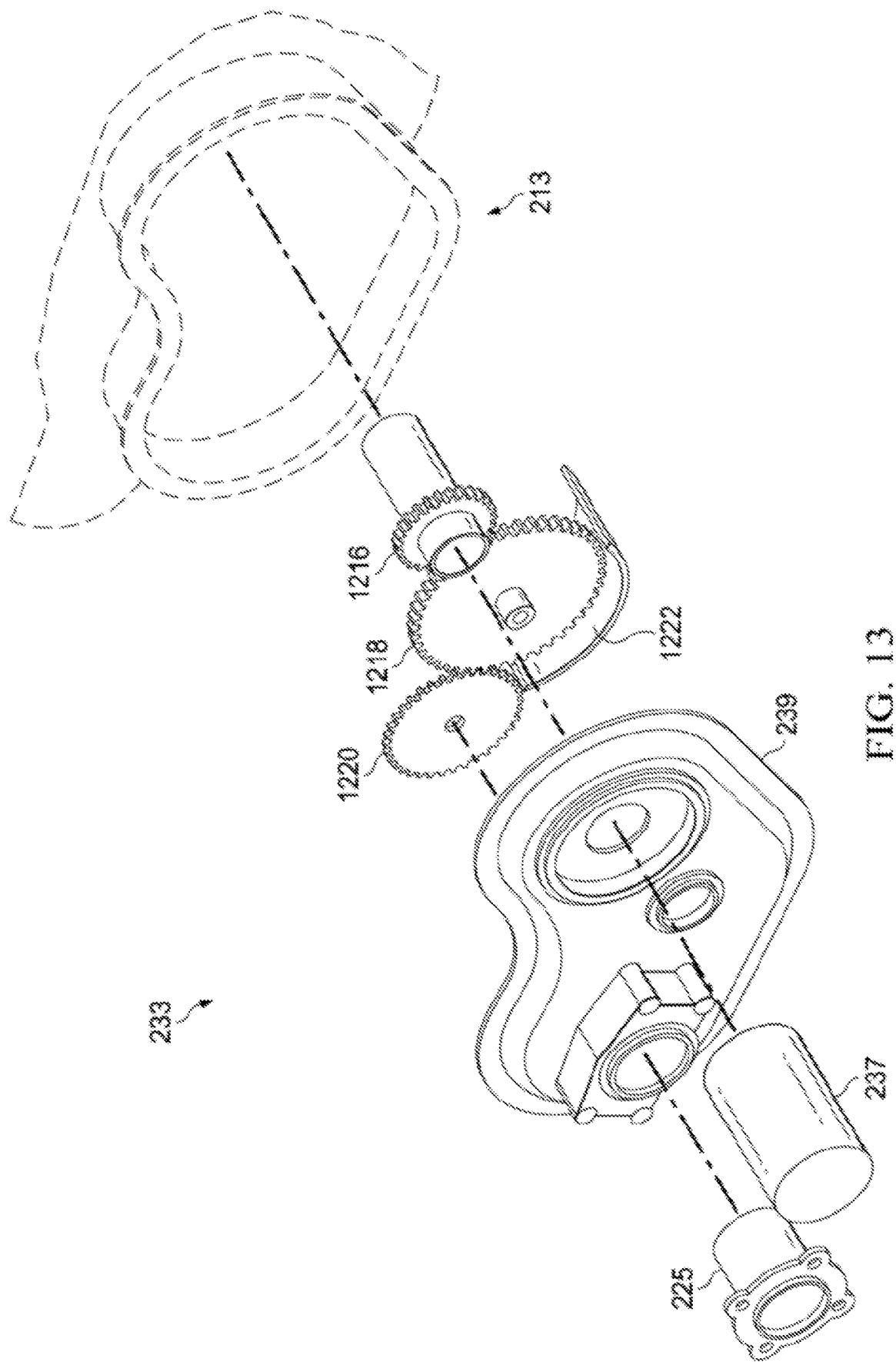

FIGS. 12 and 13 illustrate a system including a hybrid lubrication system 1250 for lubricating the main rotor gearbox 213, in accordance with some embodiments of the present disclosure. The main rotor gearbox 213 includes a mast 1225 and gears 1202, 1204, 1206a, 1206b, 1208a, 1208b, 1210a, 1210b, 1212a, 1212b, 1216, 1218, and 1220. Each of the gears includes a gear shaft about which the gear rotates and a plurality of teeth that are operable to mate with one or more adjacent gears. As is shown in FIG. 12, the gears within the gearbox are lubricated using the hybrid lubrication system 1250. The hybrid lubrication system includes 1250 a pressurized lubrication system 1230 and a non-pressurized lubrication system 1240. During operation, the gears transmit power between one another based on receiving torque which causes the gear to rotate. As the engines generate power, the power is transmitted to the driveshafts 243 and 237 via the engine reduction gearboxes 221 and 217, respectively. The driveshafts 243 and 237 transmit power to the gears 1208a and 1208b, respectively, each of which is a compound gear. The gears 1208a and 1208b transmits power to the gears 1206a and 1206b, respectively. Each of the gears 1206a and 1206b is a compound gear that, at one end, transmits power to the gear 1204 and, at the other end, transmits power to the gears 1210a and 1212a and gears 1210b and 1212b, respectively. The gear 1204 is coupled to a gear shaft that transmits power to the gears 1202, which is planetary gear system for rotating the mast 1225 to power the rotor system 203 (e.g., of FIGS. 2A and 2B). The gear 1208b also includes the gear 1216, which transmits power to the gear 1218. The gear 1218 is an idler gear which transmits power to the gear 1220. The gear 1220 is an output gear that transmits power to the tail rotor driveshaft 225 for powering the tail rotor and anti-torque system 209 (e.g., of FIGS. 2A and 2B).

The hybrid lubrication system 1250 lubricates the gears using the pressurized lubrication system 1230 and the non-pressurized lubrication system 1240. The pressurized lubrication system 1230 is an active system that requires direct power to maintain the pressure in the system to propel the lubricant. The non-pressurized lubrication system 1240 is a passive system that relies on the movement of the gears to disperse the lubricant and does not require direct power to propel the lubricant. The pressurized lubrication system 1230 includes nozzles 1214a, 1214b, and 1214c, each of which is operable to spray lubricant 1215a, 1215b, 1215c, and 1215d, respectively, onto the gears. The nozzles 1214a, 1214b, and 1214c are supplied lubricant by pressurized tubes 1213a, 1213b, 1213c, and 1213d, respectively. The nozzle 1214a is directed toward an intersection of the gears 1206a and 1208a and sprays the lubricant 1215a on the gears 1206a and 1208a. The nozzle 1214b is directed toward an intersection of the gears 1206b and 1208b and sprays the lubricant 1215b on the gears 120b and 1208b. The nozzle 1214c is directed toward the gear 1212b and sprays the lubricant 1215c on the gear 1212b. As the nozzles 1214a-c spray the gears with the lubricant, some of the lubricant may travel to other locations in the main rotor gearbox 213. The non-pressurized lubrication system includes a reservoir 1222, which is operable to catch a portion of the lubricant from the pressurized lubrication system. The reservoir 1222 operates similar to the reservoir 542 as described with respect to FIGS. 5A, 5B, 5C, and 5D. The reservoir 1222 includes a curved plate that extends from a wall of the cover 239 creates cavity in which the lubricant can pool. The reservoir 1222 is proximate the gear 1218 and follows the curvature of the gear 1218. A height of the reservoir 1222 is a fraction of the height of the gear 1218. As illustrated in the Figures, the reservoir 1222 is approximately ¼ the height of the gear 1218. The gear 1218 moves through the portion of the lubricant. The gear 1218 disperses the lubricant onto the gears 1216 and 1220 based on rotating through the portion of the lubricant. The gear 1218 can disperse the lubricant by any one or more of splashing, throwing, flinging, and/or direct contact with other gears.

Figure 14:
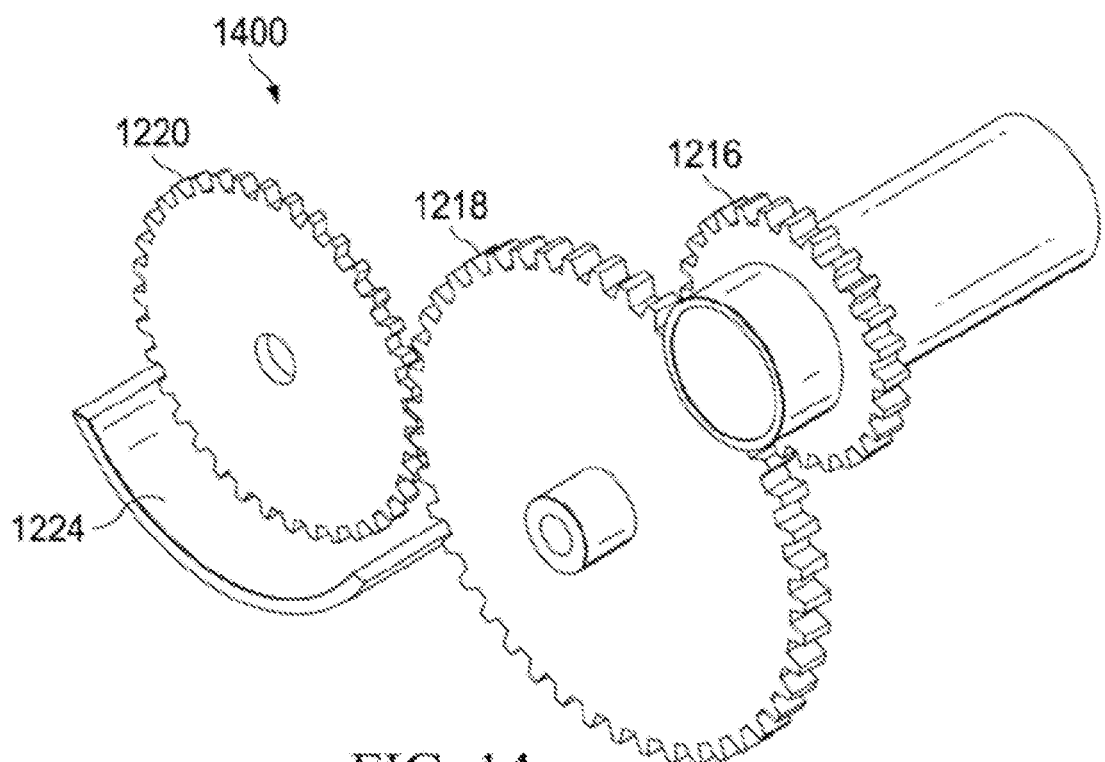
FIGS. 14, 15, 16, and 17 illustrate other systems including a hybrid lubrication system for lubricating a gearbox on an aircraft, in accordance with some embodiments of the present disclosure.
Figure 15:
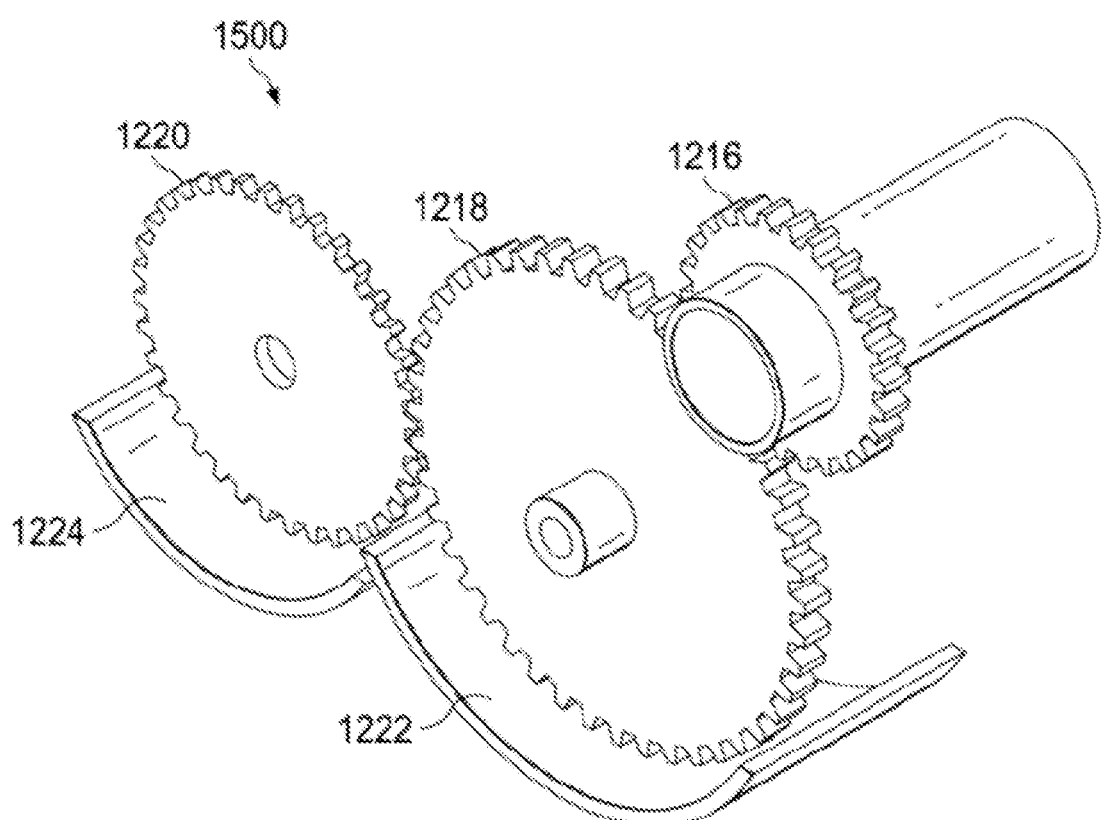
Figure 16:
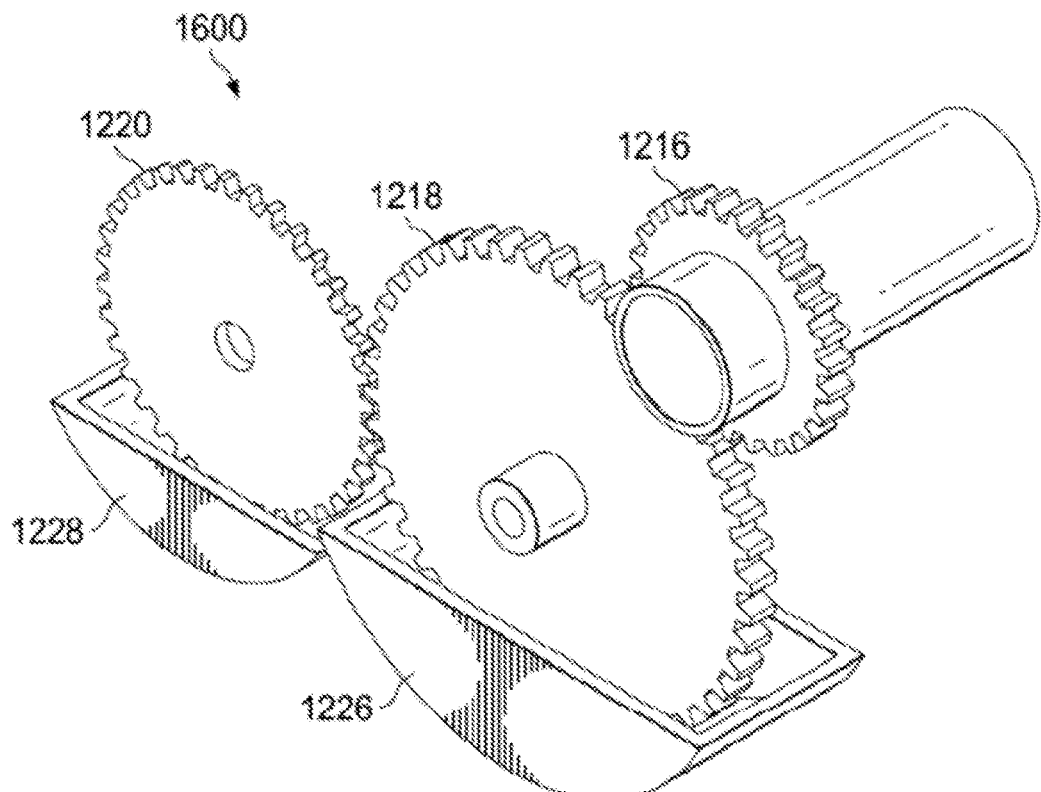
Figure 17:
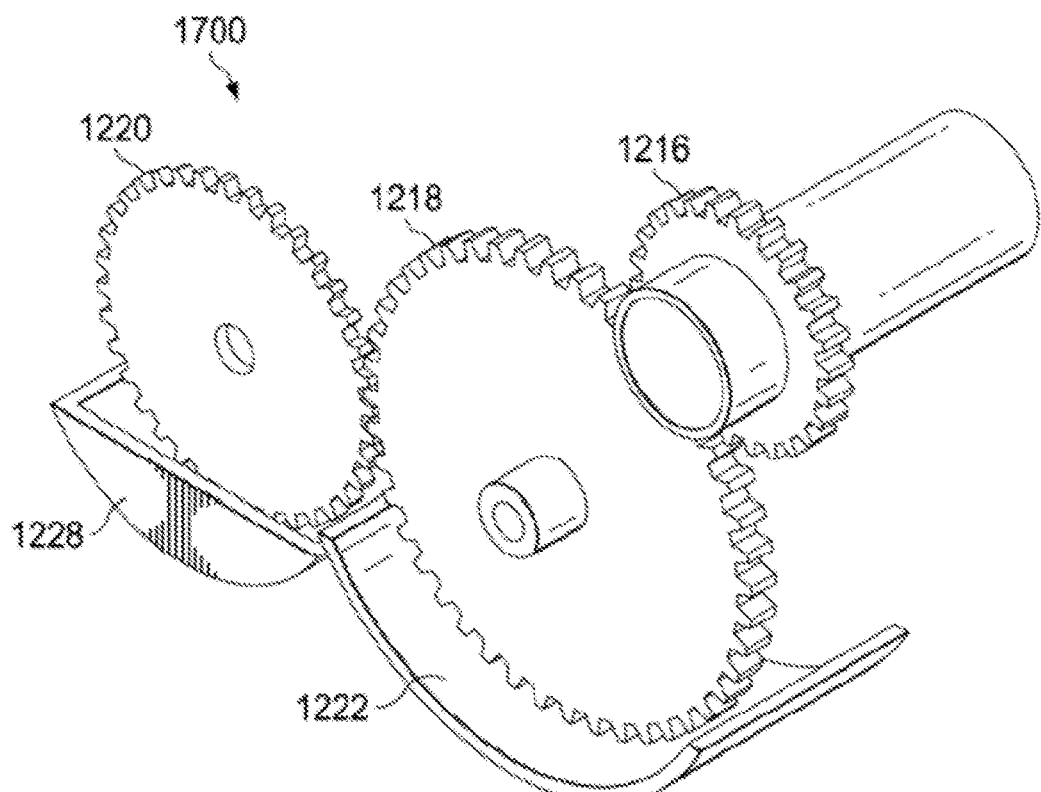

FIGS. 14, 15, 16, and 17 illustrate other systems including a hybrid lubrication system for lubricating one or more gears on an aircraft, in accordance with some embodiments of the present disclosure. FIGS. 14, 15, 16, and 17 include gears as described with FIGS. 11 and 12; the description of these gears is not repeated here only for the sake of brevity. The non-pressurized lubrication system in each of the FIGS. 14, 15, 16, and 17 vary to illustrate various aspects of a hybrid lubrication system according to some embodiments of the present disclosure. In each case the hybrid lubrication system includes a pressurized lubrication system supplying lubricant to the gears and a non-pressurized lubrication system, which includes one or more reservoirs operable to catch a portion of the lubricant from the pressurized lubrication system. FIG. 14 illustrates a system 1400 in which the non-pressurized lubrication system includes a reservoir 1224. The reservoir 1224 operates similar to the reservoir 1222 as described with respect to the FIGS. 12 and 13. The reservoir 1224 includes a curved plate that extends from a wall of the cover 239 creates cavity in which lubricant can pool. The reservoir 1224 is proximate the gear 1220 and follows the curvature of the gear 1220. A height of the reservoir 1224 is a fraction of the height of the gear 1220. During operation, the gear 1220 disperses the lubricant onto the gears 1216 and 1218 based on rotating through the portion of the lubricant. The gear 1220 can disperse the lubricant by any one or more of splashing, throwing, flinging, and/or direct contact with other gears. FIG. 15 illustrates a system 1500 in which the non-pressurized lubrication system includes the reservoir 1222 and the reservoir 1224, each of which includes a curved plate to catch the lubricant from the pressurized lubrication system. FIG. 16 illustrates a system 1600 in which the non-pressurized lubrication system includes reservoirs 1226 and 1228. Each of the reservoirs 1226 and 1228 includes a curved member and attached sidewalls to create a cavity in which to catch the lubricant. The reservoir 1226 conforms to a shape of the gear 1212. The reservoir 1228 conforms to a shape of the gear 1220. During operation, the gears 1218 and 1220 disperse the lubricant other gears (including one another) based on rotating through the lubricant connected in the reservoirs 1226 and 1228, respectively. The gear 1220 can disperse the lubricant by any one or more of splashing, throwing, flinging, and/or direct contact with other gears. FIG. 17 illustrates a system 1700 in which the non-pressurized lubrication system includes the reservoir 1222 and the reservoir 1228. The number of, size, and shapes of reservoirs in the figures are illustrative only. It will be appreciated by those of skill in the art that reservoirs of present disclosure may be employed in various numbers, having various sizes and shapes, and may be used in a variety of combinations and correspondences with one or more gears.

Figure 18:
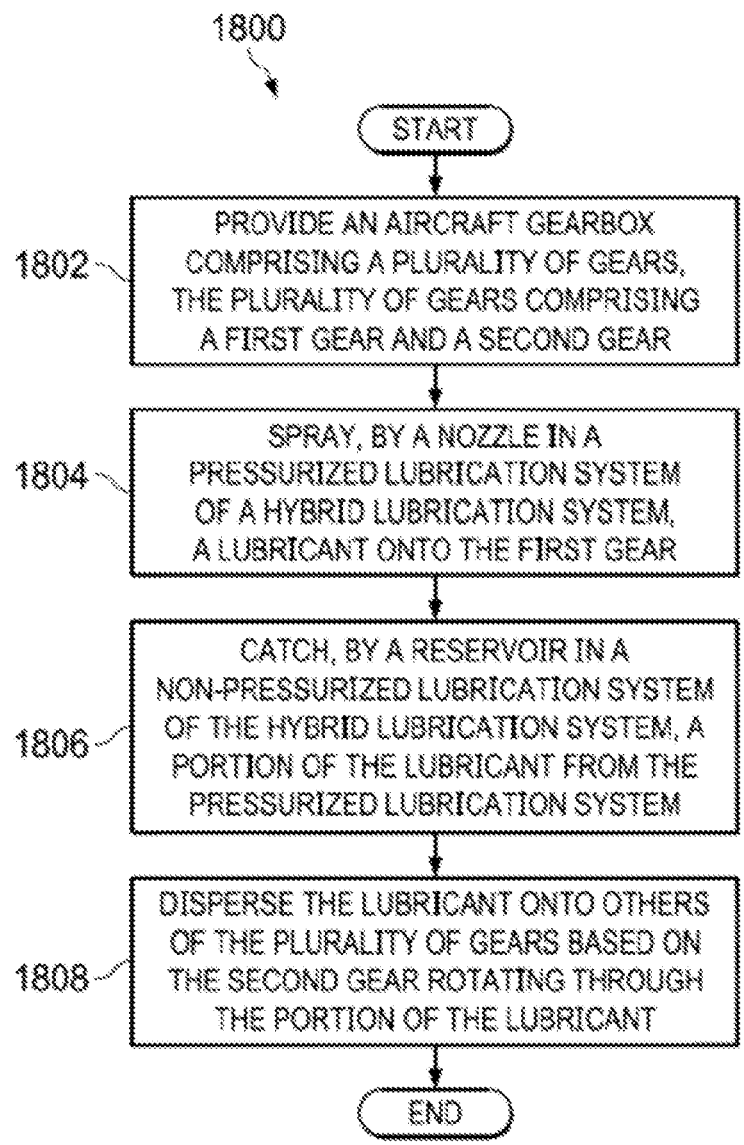
FIG. 18 illustrates a method in accordance with some embodiments of the present disclosure.

FIG. 18 illustrates a method 1800 according to some embodiments of the present disclosure. The method 1800 may begin at 1802 by providing an aircraft gearbox comprising a plurality of gears, the plurality of gears comprising a first gear and a second gear. The method 1800 uses a hybrid lubrication system comprising a pressurized lubrication system and a non-pressurized lubrication system to lubricate the plurality of gears. At 1804, a nozzle in the pressurized lubrication system sprays a lubricant onto the first gear. At 1806, a reservoir in the non-pressurized lubrication system catches a portion of the lubricant from the pressurized lubrication system. The method 1800 may terminate at 1808 when the lubricant is dispersed onto others of the plurality of gears based on the second gear rotating through the portion of the lubricant. In some embodiments, one or more portions of the method 1800 may repeat, e.g., in a loop.

Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. An aircraft gearbox comprising:
a plurality of gears operable to rotate based on torque received from a driveshaft, the plurality of gears comprising a first gear and a second gear; and
a hybrid lubrication system operable to lubricate the plurality of gears, the hybrid lubrication system comprising:
a pressurized lubrication system comprising a nozzle operable to spray a lubricant onto the first gear; and
a non-pressurized lubrication system comprising a reservoir operable to catch a portion of the lubricant from the pressurized lubrication system, wherein the second gear is operable to disperse the lubricant onto others of the plurality of gears based on rotating through the portion of the lubricant,
wherein the non-pressurized lubrication system further comprises a shroud between the first gear and the second gear and defining the non-pressurized lubrication system, the shroud completely surrounding a perimeter of the non-pressurized lubrication system and confine the portion of the lubricant within the non-pressurized lubrication system and to return overspray of the lubricant sprayed onto the first gear and lubricant dispersed by the second gear to the reservoir.

2. The aircraft gearbox of claim 1, wherein the reservoir conforms to a shape of the second gear.

3. The aircraft gearbox of claim 1, wherein the reservoir is operable to surround a portion of only the second gear.

4. The aircraft gearbox of claim 1, wherein the first gear is operable to transmit power to a rotor on a rotorcraft and the second gear is operable to transmit power to an auxiliary system on the rotorcraft.

5. The aircraft gearbox of claim 1, wherein the plurality of gears comprises:
a first set of gears comprising the first gear, and
a second set of gears comprising the second gear; and
wherein the pressurized lubrication system is operable to spray the lubricant onto the first set of gears and the second gear is operable to disperse the lubricant onto others of the second set of gears based on rotating through the portion of the lubricant.

6. The aircraft gearbox of claim 5, wherein the pressurized lubrication system comprises a plurality of nozzles each corresponding to one of the first set of gears.

7. The aircraft gearbox of claim 5, wherein the non-pressurized lubrication system comprises a plurality of reservoirs each corresponding to a different one of the second set of gears.

8. The aircraft gearbox of claim 5, wherein each gear in the first set of gears is operable to mesh with only the first set of gears, and each gear in the second set of gears is operable to mesh with only the second set of gears.

9. An aircraft comprising:
an engine;
a driveshaft coupled to the engine; and
a gearbox comprising:
a plurality of gears operable to rotate based on torque received from the driveshaft, the plurality of gears comprising a first gear and a second gear; and
a hybrid lubrication system operable to lubricate the plurality of gears, the hybrid lubrication system comprising:
a pressurized lubrication system comprising a nozzle operable to spray a lubricant onto the first gear; and
a non-pressurized lubrication system comprising a reservoir operable to catch a portion of the lubricant from the pressurized lubrication system, wherein the second gear is operable to disperse the lubricant onto others of the plurality of gears based on rotating through the portion of the lubricant,
wherein the non-pressurized lubrication system further comprises a shroud between the first gear and the second gear and defining the non-pressurized lubrication system, the shroud encircling an outer perimeter of the non-pressurized lubrication system and configured to confine the portion of the lubricant within the non-pressurized lubrication system and to return overspray of the lubricant sprayed onto the first gear and lubricant dispersed by the second gear to the reservoir.

10. The aircraft of claim 9, wherein the reservoir conforms to a shape of the second gear.

11. The aircraft of claim 9, wherein the reservoir is operable to surround a portion of only the second gear.

12. The aircraft of claim 9, wherein the plurality of gears comprises:
a first set of gears comprising the first gear, and
a second set of gears comprising the second gear; and
wherein the pressurized lubrication system is operable to spray the lubricant onto the first set of gears and the second gear is operable to disperse the lubricant onto others of the second set of gears based on rotating through the portion of the lubricant.

13. The aircraft of claim 12, wherein the pressurized lubrication system comprises a plurality of nozzles each corresponding to one of the first set of gears.

14. The aircraft of claim 12, wherein the non-pressurized lubrication system comprises a plurality of reservoirs each corresponding to a different one of the second set of gears.

15. A method comprising:
providing an aircraft gearbox comprising a plurality of gears, the plurality of gears comprising a first gear and a second gear; and
lubricating the plurality of gears with a hybrid lubrication system comprising a pressurized lubrication system and a non-pressurized lubrication system, wherein the lubricating comprises:
spraying, by a nozzle in the pressurized lubrication system, a lubricant onto the first gear;
catching, by a reservoir in the non-pressurized lubrication system, a portion of the lubricant from the pressurized lubrication system; and
dispersing the lubricant onto others of the plurality of gears based on the second gear rotating through the portion of the lubricant,
wherein the non-pressurized lubrication system further comprises a shroud between the first gear and the second gear and defining the non-pressurized lubrication system, the shroud configured to entirely surround the non-pressurized lubrication system along a perimeter thereof and to confine the portion of the lubricant within the non-pressurized lubrication system and to return overspray of the lubricant sprayed onto the first gear and lubricant dispersed by the second gear to the reservoir.

16. The method of claim 15, wherein the reservoir conforms to a shape of the second gear.

17. The method of claim 15, further comprising:
transmitting, by the first gear, power to a rotor on an aircraft; and
transmitting, by the second gear, power to an auxiliary system on the aircraft.

18. The method of claim 15, wherein the plurality of gears comprises:
a first set of gears comprising the first gear, and
a second set of gears comprising the second gear; and
further comprising:
spraying, by the pressurized lubrication system, the lubricant onto the first set of gears; and
dispersing the lubricant onto others of the second set of gears based on the second gear rotating through the portion of the lubricant.

19. The method of claim 18, wherein the pressurized lubrication system comprises a plurality of nozzles, and further comprising:
spraying, by each of the plurality of nozzles, the lubricant onto one of the first set of gears.

20. The method of claim 18, wherein the non-pressurized lubrication system comprises a plurality of reservoirs corresponding to a different one of the second set of gears.

* * * * *